US012746785B2

(12) United States Patent
Sethi et al.

(10) Patent No.: US 12,746,785 B2
(45) Date of Patent: *Sep. 29, 2026

(54) SMART WHEEL SYSTEM HAVING AN INTERCONNECT RING TOPOLOGY

(71) Applicant: TDK Corporation, Tokyo (JP)

(72) Inventors: Rakesh Sethi, Saratoga, CA (US); Vibhu Vivek, Santa Clara, CA (US); John Sze, Saratoga, CA (US)

(73) Assignee: TDK Corporation, Tokyo (JP)

( * ) Notice: Subject to any disclaimer, the term of this patent is extended or adjusted under 35 U.S.C. 154(b) by 889 days.

This patent is subject to a terminal disclaimer.

(21) Appl. No.: 18/100,384

(22) Filed: Jan. 23, 2023

(65) Prior Publication Data

US 2023/0237300 A1 Jul. 27, 2023

Related U.S. Application Data

(60) Provisional application No. 63/302,949, filed on Jan. 25, 2022.

(51) Int. Cl.
*B60C 23/04* (2006.01)

(52) U.S. Cl.
CPC ...... *B60C 23/0496* (2013.01); *B60C 23/0411* (2013.01)

(58) Field of Classification Search
CPC ............. B60C 23/0411; B60C 23/0423; B60C 23/0447; B60C 23/0494; B60C 23/0479; B60C 23/064; B60C 23/0493; B60C 23/0498; B60C 23/041; B60C 23/0452; B60C 23/0486; B60C 23/0496
USPC .................................................. 310/311, 319
See application file for complete search history.

(56) References Cited

U.S. PATENT DOCUMENTS 6,339,956 B1 1/2002 Huinink et al.
8,035,502 B2 * 10/2011 Heise ................. B60C 23/0493 73/146
11,325,432 B2 5/2022 Vivek et al.
2010/0274607 A1 10/2010 Carresjo et al.
2011/0308683 A1 12/2011 Crano
(Continued)

FOREIGN PATENT DOCUMENTS

EP 2186657 A1 5/2010

OTHER PUBLICATIONS

Extended European Search Report issued in related European Patent Application No. 22207708.3 dated Apr. 4, 2023.

*Primary Examiner* — Jorge L Salazar, Jr.
(74) *Attorney, Agent, or Firm* — Morgan, Lewis & Bockius LLP

(57) ABSTRACT

Systems and methods for smart wheel implementations are disclosed. In some embodiments, a smart wheel system includes: a first plurality of modules attached to a circumferential surface of a wheel, wherein the first plurality of modules are interconnected with one another in a ring configuration that spans along the circumferential surface of the wheel, wherein the first plurality of modules includes: at least one energy harvesting (EH) module comprising at least one EH component configured to convert a force acting on the at least one EH component into at least one electrical signal; and at least one dummy cavity module comprising at least one electronic module, wherein the at least one EH module and the at least one dummy cavity module are each electrically coupled to an electrical interface coupled to the wheel.

20 Claims, 39 Drawing Sheets

(56) References Cited

U.S. PATENT DOCUMENTS

| | | | |
|---|---|---|---|
| 2020/0049581 | A1 | 2/2020 | Thornham et al. |
| 2021/0028725 | A1 | 1/2021 | Griswold et al. |

* cited by examiner

300

SMART WHEEL SYSTEM HAVING AN INTERCONNECT RING TOPOLOGY

CROSS-REFERENCE TO RELATED APPLICATIONS

This application claims priority to U.S. Provisional Patent Application No. 63/302,949 entitled "Interconnect and Interface Between Energy Harvesting Module and In-Tire Sensor and Methods and Systems Using Same" filed on Jan. 25, 2022, which is incorporated by reference herein in its entirety.

TECHNICAL FIELD

This application relates generally to sensor systems and, more particularly, relates to systems and methods for implementation of a smart wheel system having an interconnect ring topology.

BACKGROUND

In the area of automotive sensor systems, the demand for advanced sensing applications to complement existing electronic safety systems has drawn considerable attention. This includes, for example, measurements of temperature, pressure, acceleration, and forces (static and dynamic) acting on a tire, wheel and car. All these sensors create an increased power demand to operate and transmit data more frequently. Current power sources (e.g., lithium ion batteries) driving these sensors are limited in their capacity and exhibit drawbacks such as low durability, difficulty of replacement, and most notably, inferior sustainability in terms of environmental impact. With increased power load, these power sources are further subjected to accelerated discharge cycles, resulting in frequent or premature replacement of entire sensor modules. This may increase the overall cost of ownership and maintenance to a user.

An alternative approach for replacing the battery in these sensor systems involves harvesting energy from the environment. Energy harvesters are devices that transform energy from various sources such as kinetic, heat, light and mechanical energy into usable electrical energy. When these energy harvesters are mounted outside the bead area of the tire-wheel, supplying power inside the sealed area of the tire can be challenging. These challenges include a) mounting and alignment of harvesters with respect to interconnects that can carry power inside the tire, b) maintaining airtight (pressurized) seal while allowing the interconnects to go inside the bead area, and c) providing access to power interconnects in the side wall and tread sections of the tire.

In addition to increased power demand, these sensors may process, transmit and receive streaming data using wired and wireless methods at low or high bandwidth to an external communication module or gateway that are placed in close proximity around the wheels or can be housed inside the vehicle. As the data packets get larger and increased transmission frequency, especially when communicating from vehicle to infrastructure (V2X), the current BLE, 5G and 6G wireless transmission methods will not be sufficient for meeting this throughput through the wheel.

Alternatively, these external modules can be placed on stationary structures like the road, towers and buildings which are further away and will need stronger wireless range for communication. Furthermore, due to the enclosed Faraday cages that are formed with the steel belted radials and other internal structures of the tire and the wheel, the wireless transceiver may be limited in the transmission and receiver range when their antenna is situated inside the pressurized area of the wheel. Other applications may utilize external sensors and communication modules mounted on the outside of the tire (non-pressurized area) as well as various locations in and around the wheels that may communicate to sensors or processors inside the pressurized area using wired communication.

The foregoing examples of the related art and limitations related therewith are intended to be illustrative and not exclusive. Other limitations of the related art will become apparent upon a reading of the specification and a study of the drawings.

SUMMARY

The exemplary embodiments disclosed herein are directed to solving the issues relating to one or more of the problems presented in the prior art, as well as providing additional features that will become readily apparent by reference to the following detailed description when taken in conjunction with the accompanied drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In certain embodiments, a smart wheel system includes: a first plurality of modules attached to a circumferential surface of a wheel, wherein the first plurality of modules are interconnected with one another in a ring configuration that spans along the circumferential surface of the wheel, wherein the first plurality of modules includes: at least one energy harvesting (EH) module that includes at least one EH component configured to convert a force acting on the at least one EH component into at least one first electrical signal; and at least one dummy cavity module comprising at least one electronic module; wherein the at least one EH module and the at least one dummy cavity module are each electrically coupled to an electrical interface coupled to the wheel.

In certain embodiments, the at least one first electrical signal provides energy to at least one sensor disposed within a tire coupled to the wheel. In alternative embodiments, the at least one first electrical signal indicates a value of at least one physical parameter associated with the tire.

In certain embodiments, the first plurality of modules is located between a rim portion of the wheel and a bead area of a tire mounted on the wheel, and wherein the first plurality of modules further includes at least one dummy module.

In certain embodiments, the at least one EH module includes at least one piezoelectric component, wherein the at least one piezoelectric component is configured to produce energy in response to mechanical strain imparted on the at least one piezoelectric component, wherein the at least one piezoelectric component is configured to deform while experiencing the mechanical strain.

In certain embodiments, the electrical interface includes a plurality of conductors, wherein the plurality of conductors includes at least two of the following: a first conductor for power signal transmission; a second conductor for data signal transmission; one or more radio frequency (RF) antenna traces; and one or more optical fibers for transmitting optical signals collected from an optical transceiver.

In certain embodiments, the electrical interface includes a valve stem interconnect structure, wherein the valve stem interconnect structure includes a flexible printed circuit board (PCB) cable that electrically couples a first sensor disposed inside a pressurized area of a tire mounted on the wheel to a connector disposed outside of the pressurized area.

In certain embodiments, the at least one electronic module includes at least one of the following: an energy storage element for storing the electrical energy converted from the at least one EH module; an electric double layer capacitor (EDLC) energy storage element for memory backup; a power management control integrated circuit (IC); one or more high voltage input multilayer ceramic capacitors (MLCCs); and an electrical interconnect module for in-tire power delivery.

In certain embodiments, the first plurality of modules spans an entirety of the circumferential surface of the wheel.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention. These drawings are provided to facilitate the reader's understanding of the invention and should not be considered limiting of the breadth, scope, or applicability of the invention. It should be noted that for clarity and ease of illustration these drawings are not necessarily drawn to scale.

DETAILED DESCRIPTION OF EXEMPLARY EMBODIMENTS

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be rearranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Figure 1:
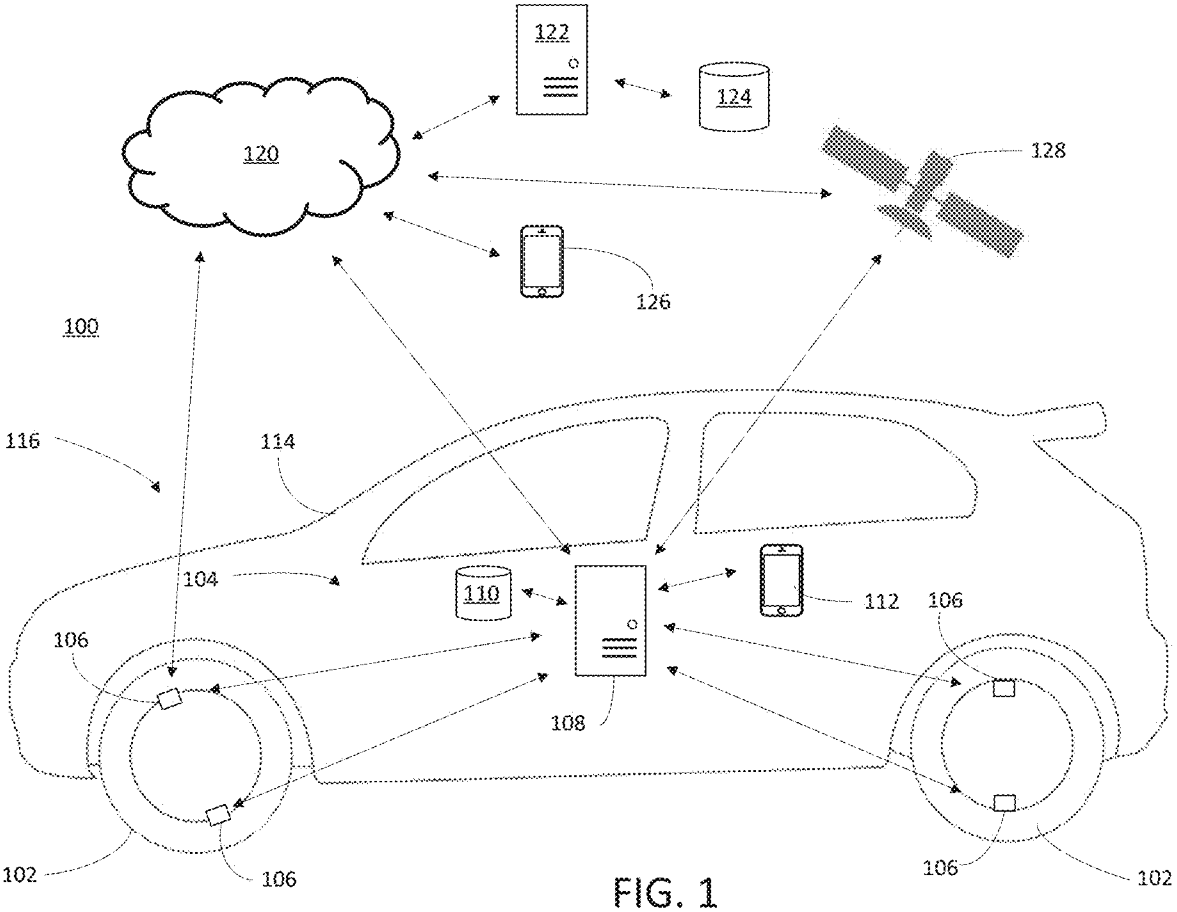
FIG. 1 is a diagram of a smart wheel sensor system that integrates at least one smart wheel, in accordance with various embodiments.

FIG. 1 is a diagram of a smart wheel sensor system 100 that integrates at least one smart wheel 102, in accordance with various embodiments. The smart wheel sensor system 100 may include a local sensor system 104 (e.g., a local smart wheel sensor system) with a device platform 106 arrayed on respective smart wheels 102. The device platform 106 may represent devices on a smart wheel, such as an energy harvester and/or sensor powered by an energy harvester.

This local sensor system 104 may include a local smart wheel server 108 that communicates with the sensors within the device platform 106. Accordingly, each device platform 106 may include at least one sensor and also include ancillary interfaces, such as communication interfaces, for communication with the local smart wheel server 108. This local smart wheel server 108 may also be in communication with a local smart wheel datastore 110 and any local user devices 112, such as a smartphone. For ease of explanation, the term local may refer to devices that are bound within or on a vehicle body 114 or a smart wheel 102 of a vehicle 116.

In contrast, the term remote may refer to devices that are outside of the vehicle body 114 or smart wheel 102 of the vehicle 116. For example, the local smart wheel server 108 may be configured to communicate with a remote network 120, such as the Internet. This remote network 120 may further connect the local smart wheel server 108 with remote servers 122 in communication with remote datastores 124 or remote user devices 126. In addition, the local smart wheel server 108 may be in communication with external sensors or devices, such as a remote satellite 128 for global positioning system (GPS) information.

In various embodiments, at least some of the devices of the device platform 106 may be configured to communicate with the local smart wheel server 108 via a communications interface. This communications interface may enable devices to communicate with each other using any communication medium and protocol. Accordingly, the communications interface 280 may include any suitable hardware, software, or combination of hardware and software that is capable of coupling the device platform 106 with the local smart wheel server 108. The communications interface may be arranged to operate with any suitable technique for controlling information signals using a desired set of communications protocols, services or operating procedures. The communications interface may comprise the appropriate physical connectors to connect with a corresponding communications medium. In certain embodiments, this communications interface may be separate from a controller area network (CAN) bus. For example, the communications interface may facilitate wireless communications within the local sensor system 104 (e.g., between the device platforms 106 and the local smart wheel server 108). Further discussion of such a communications interface is provided in greater detail below.

In certain embodiments, at least some of the devices of the device platform 106 may be configured to communicate with the remote network 120. For example, sensor data produced by a sensor of the device platform 106 may be communicated to the remote servers 122, the remote datastores 124, the remote user devices 126, and/or the remote satellite 128 via the remote network 120. In various embodiments, certain devices of the device platform 106 may communicate directly with the remote network 120. For example, certain devices of the device platform 106 may include communication interfaces (discussed further below) that may be configured to communicate directly with the remote network 120 in a manner that bypasses the local server 108. In other embodiments, certain devices of the device platform 106 may communicate indirectly with the remote network 120. For example, certain devices of the device platform 106 may include communication interfaces (discussed further below) that may be configured to communicate indirectly with the remote network 120 via the local server 108, which includes one or more communication interfaces (discussed further below) to communicate with external devices via various communication protocols (e.g., LTE, 5G, etc.), as discussed in further detail below.

These communications from the device platform 106 to the remote server 122, whether direct or indirect, may include sensor data collected by the device platform for analysis by the remote server 122. This sensor data may be analyzed by the remote server 122 to determine an action that may be performed by the local server 108, in accordance with various embodiments. For example, as will be discussed in further detail below, this sensor data may be utilized to determine a parameter value. Then certain actions may be performed based on the state of the parameter value, such as in response to the parameter value meeting certain threshold values (e.g., an alert or notification presented via a user interface). This determination of a parameter value may be performed at the remote server 122 and then the parameter values communicated to the local server 108 to determine the action to be performed based on the state of the parameter value. In other embodiments, both the determination of a parameter value and the determination of the resultant action may be performed by the remote server 122. Then the remote server 122 may communicate an indication of the action to be performed to the local server 108 for implementation (e.g., as an instruction to the local server 108 for implementation). Although certain embodiments describe sensor data as being communicated to a remote server for processing, sensor data may be processed in other manners as desired for different applications in accordance with various embodiments. For example, the sensor data may be processed locally at the local server 108 with or without additional inputs provided from the remote server 122, remote user device 126, and/or remote satellite 128, as will be discussed further below. In some embodiments, the device platform 106 may communicate directly with the user device 112 (e.g., a smartphone) which can then communicate directly or indirectly with the local server 108, remote network 120, remote user device 126 and/or remote satellite 128. In further embodiments, the wheel 102 (e.g., serving as an antenna) and/or the sensor platform 106 may have a direct communication link with the remote user device 126 or remote satellite 128 (e.g., for purposes of internet access and/or GPS applications).

Figure 2:
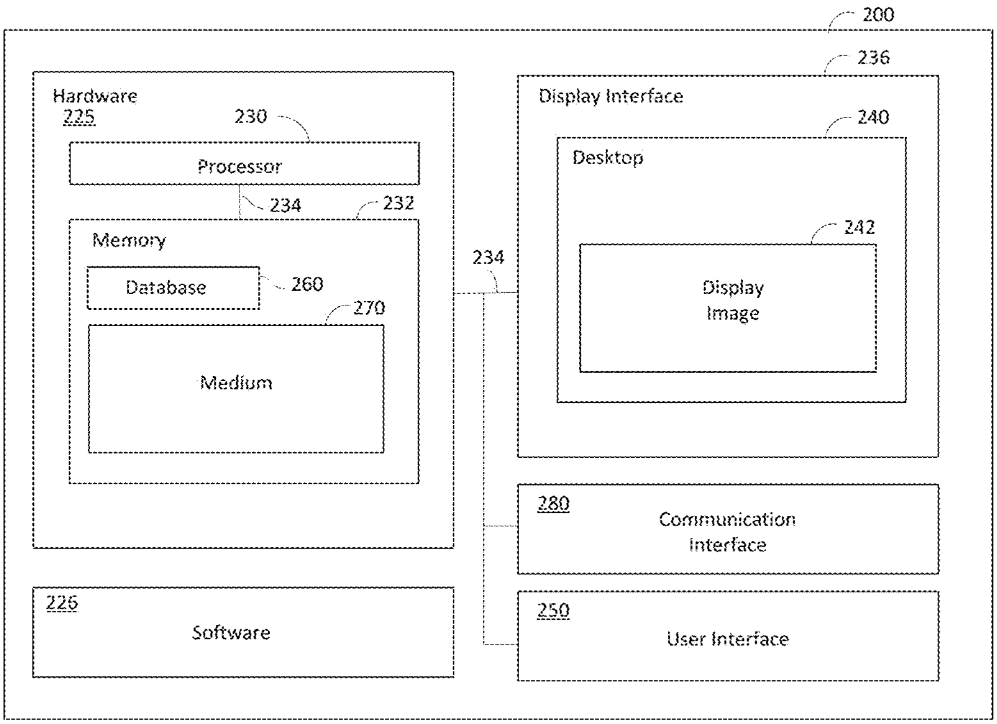
FIG. 2 is a block diagram of an exemplary computing device, in accordance with various embodiments.

FIG. 2 is a block diagram of an exemplary computing device 200, in accordance with various embodiments. As noted above, the computing device 200 may represent exemplary components of a particular local smart wheel server 108, local user device 112, remote server 122, remote user device 126, certain devices of a device platform 106 (e.g., a sensor of the device platform), or remote satellite 128 as discussed above in connection with FIG. 1. Returning to FIG. 2, in some embodiments, the computing device 200 includes a hardware unit 225 and software 226. Software 226 can run on hardware unit 225 (e.g., the processing hardware unit) such that various applications or programs can be executed on hardware unit 225 by way of software 226. In some embodiments, the functions of software 226 can be implemented directly in the hardware unit 225 (e.g., as a system-on-a-chip, firmware, field-programmable gate array ("FPGA"), etc.). In some embodiments, the hardware unit 225 includes one or more processors, such as processor 230. In some embodiments, processor 230 is an execution unit, or "core," on a microprocessor chip. In some embodiments, processor 230 may include a processing unit, such as, without limitation, an integrated circuit ("IC"), an application specific integrated circuit (ASIC), a digital signal processor (DSP), an attached support processor (ASP), a microcomputer, a programmable logic controller ("PLC"), and/or any other programmable circuit. Alternatively, processor 230 may include multiple processing units (e.g., in a multi-core configuration). The above examples are exemplary only, and, thus, are not intended to limit in any way the definition and/or meaning of the term "processor." Hardware unit 225 also includes a system memory 232 that is coupled to processor 230 via a system bus 234. Memory 232 can be a general volatile RAM. For example, hardware unit 225 can include a 32-bit microcomputer with 2 Mbit ROM and 64 Kbit RAM, and/or a number of GB of RAM. Memory 232 can also be a ROM, a network interface (NIC), or any combination of known volatile and/or non-volatile memory devices with appropriate capacities for various desired applications, in accordance with various embodiments.

In some embodiments, the system bus 234 may couple each of the various system components together. It should be noted that, as used herein, the term "couple" is not limited to a direct mechanical, communicative, and/or an electrical connection between components, but may also include an indirect mechanical, communicative, and/or electrical connection between two or more components or a coupling that is operative through intermediate elements or spaces. The system bus 234 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, optionally, the computing device 200 can also include at least one media output component or display interface 236 for use in presenting information to a user. Display interface 236 can be any component capable of conveying information to a user and may include, without limitation, a display device (not shown) (e.g., a light-emitting diode ("LED") display, a liquid crystal display ("LCD"), an organic light emitting diode ("OLED") display, or an audio output device (e.g., a speaker or headphones). In some embodiments, computing device 200 can provide at least one desktop interface, such as desktop 240. Desktop 240 can be an interactive user environment provided by an operating system and/or applications running within computing device 200, and can include at least one screen or display image, such as display image 242. Desktop 240 can also accept input from a user in the form of device inputs, such as keyboard and mouse inputs. In some embodiments, desktop 240 can also accept simulated inputs, such as simulated keyboard and mouse inputs. In addition to user input and/or output, desktop 240 can send and receive device data, such as input and/or output for a FLASH memory device local to the user, or to a local printer.

In some embodiments, the computing device 200 includes an input or a user interface 250 for receiving input from a user. User interface 250 may include, for example, a keyboard, a pointing device, a mouse, a stylus, a touch sensitive panel (e.g., a touch pad or a touch screen), a position detector, and/or an audio input device. A single component, such as a touch screen, may function as both an output device of the media output component and the input interface. In some embodiments, mobile devices, such as tablets, can be used.

In some embodiments, the computing device 200 can include a database 260 as a datastore within memory 232, such that various information can be stored within database 260. Alternatively, in some embodiments, database 260 can be included within a remote server (not shown) with file sharing capabilities, such that database 260 can be accessed by computing device 200 and/or remote end users. In some embodiments, a plurality of computer-executable instructions can be stored in memory 232, such as one or more computer-readable storage mediums 270 (only one being shown in FIG. 2). Computer-readable storage medium 270 includes non-transitory media and may include volatile and nonvolatile, removable and non-removable mediums implemented in any method or technology for storage of information such as computer-readable instructions, data structures, program modules or other data. The instructions may be executed by processor 230 to perform various functions described herein.

In the example of FIG. 2, the computing device 200 can be a communication device, a storage device, or any device capable of running a software component. For non-limiting examples, the computing device 200 can be but is not limited to a local smart wheel server, a local user device, a remote server, a remote user device, a device of the device platform, a remote satellite, a smartphone, a laptop PC, a desktop PC, a tablet, a Google™ Android™ device, an iPhone®, an iPad®, and a voice-controlled speaker or controller.

The computing device 200 has a communications interface 280, which enables the computing device 200 to communicate with the user and other devices using one or more known communication mediums and communication protocols. Here, the communication mediums and protocols can be but are not limited to, the Internet, an intranet, a wide area network (WAN), a local area network (LAN), a wireless network, Bluetooth, Wi-Fi, and a mobile communication network.

In some embodiments, the communications interface 280 may include any suitable hardware, software, or combination of hardware and software that is capable of coupling the computing device 200 to one or more networks and/or additional devices. The communications interface 280 may be arranged to operate with any suitable technique for controlling information signals using a desired set of communications protocols, services or operating procedures. The communications interface 280 may comprise the appropriate physical connectors to connect with a corresponding communications medium, whether wired or wireless. In some embodiments, the communications interface 280 includes radio frequency (RF) communications circuitry and at least one antenna for transmitting and receiving RF signals in accordance with various known communication protocols (e.g., LTE, 5G, Wi-fi, etc.).

A communications network may be utilized as a means of communication. In various aspects, the network may comprise local area networks (LAN), controller area networks (CAN), as well as wide area networks (WAN) including without limitation the Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., communication nodes) that utilize, at least in part, wireless technology including various protocols and combinations of protocols associated with wireless transmission, data, and devices. The communication nodes can include, for example, wireless devices such as mobile terminals, stationary terminals, base stations, access points, smartphones, and other known devices capable wireless communications via various wireless communication protocols. Further examples of communication nodes can include wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fiber Channel, MIDI, ATA, Serial ATA, PCI Express, T-1 (and variants), Industry Standard Architecture (ISA) parallel communication, Small Computer System Interface (SCSI) communication, Peripheral Component Interconnect (PCI) communication, CAN interface, Local Interconnect Networks (LIN), Inter-Integrated Circuit (I2C), Serial Peripheral Interface (SPI), or one wire interface, to name only a few examples.

Accordingly, in various aspects, the communications interface 280 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 280 may comprise a wireless interface comprising (e.g., including) one or more antennas, transmitters, receivers, transceivers, amplifiers, filters, control logic, and so forth.

In various aspects, the communications interface 280 may provide data communications functionality in accordance with a number of protocols. Examples of protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, 4G-LTE, 5G (new radio) and so forth. Further examples of wireless protocols may comprise wireless personal area network (PAN) protocols, such as an Infrared protocol, a protocol from the Bluetooth Special Interest Group (SIG) series of protocols, including Bluetooth Specification versions v1.0, v1.1, v1.2, v2.0, v2.0, v3.0, v4.0, v5.0 and beyond with Enhanced Data Rate (EDR), Bluetooth Low Energy (BLE), as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

Figure 3A:
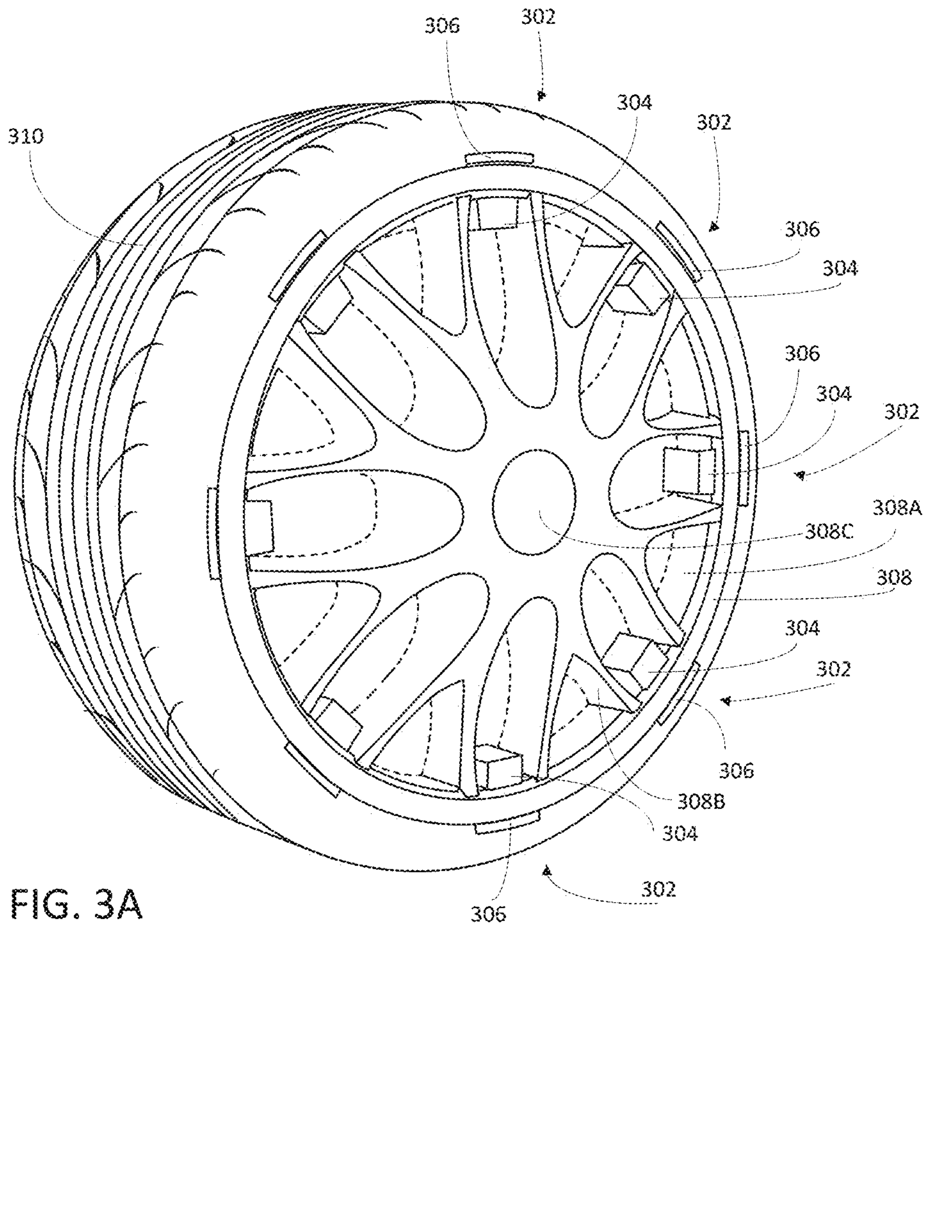
FIG. 3A is a perspective illustration of a smart wheel, in accordance with various embodiments.

FIG. 3A is a perspective illustration of a smart wheel 300, in accordance with various embodiments. The smart wheel 300 may include a device platform 302 of at least one device. More specifically, the device platform 302 may include at least one device that is a sensor within the sensor housing 304 and at least one device that is an energy harvester 306. The device platform may be supported by (e.g., be positioned along) a rotatable component 308 of the smart wheel 300. The rotatable component 308 may include, for example, a rim of the smart wheel 300 within which a circumference of the rotatable component 308 is bound.

Although the device platform is illustrated as eight pairs of sensor housings 304 and energy harvesters 306, any number of sensor housings and energy harvesters may be implemented in a device platform as desired for different applications in various embodiments. For example, other embodiments may include multiple sensor housings for each energy harvester and yet further embodiments may include multiple energy harvesters for each sensor housing. Although certain embodiments describe the sensor housing 304 as being located directly on a rim 308A of the smart wheel 300 (e.g., on the rim of the rotatable component 308 of the smart wheel 300), the sensor housing may also be located in other parts of a smart wheel 300 as desired for different applications in various embodiments. For example, the sensor housing (and the constituent sensors) may be located closer to the center of the rotatable component 308, such as along the spokes 308B of the rotatable component 308 or around the center 308C (e.g., proximate a cap) of the rotatable component 308 in particular embodiments.

In various embodiments, the sensor housing may represent one or more sensors together within the sensor housing along with functional modules such as, for example, a battery or other energy storage medium configured to store energy produced by the energy harvester. In certain embodiments, the sensor housing may include a system bus (e.g., a conductive element of a printed circuit board) that connects the various portions of the sensor housing together.

Furthermore, the sensor housing may include other functional modules, such as a communications interface to communicate the sensor data captured by the various sensors of the sensor housing to a local smart wheel server. This communications interface may include, for example, a communications interface for data offload (e.g., via millimeter and/or gigahertz wavelength communications) to a local smart wheel server, to other vehicles, an infrastructure (e.g., a remote network) and/or user devices. As a further example, this communication interface may facilitate wireless communications, such as via Bluetooth, radio frequency, radio wave, ultrasonic, and/or any other type of communication protocol or medium. This communication interface may be configured to communicate with, for example, on board electronic control units (ECUs) and/or advanced driver-assistance (ADAS) systems on a vehicle. Additionally, the sensor housing, optionally, may include a processor or any other circuitry to facilitate the collection, communication, and/or analysis of sensor data produced by the constituent sensors of the sensor housing.

Various types of sensors may be integrated with the sensor housing, in accordance with various embodiments. For example, the sensor housing may include a shock sensor that may sense an amount of electric potential produced by the energy harvester. The shock sensor may be configured to wake up, or otherwise activate the sensors and/or functional modules of the sensor housing when a sufficient amount of electric potential is produced by the energy harvester. Stated another way, the shock sensor may conceptually include the energy harvester such that the shock sensor is configured to transition various sensors and/or functional modules of the sensor housing from a low power or inactive state to a powered on or active state based on the energy harvester producing more than a threshold amount of energy in response to mechanical deformation. In certain embodiments, the energy sensed by the shock sensor may be stored in a battery for standby power when the energy harvester is not producing any energy (e.g., when there is no mechanical stress applied to the energy harvester).

In particular embodiments, the sensor housing may include a height sensor configured to produce barometric pressure sensor data. Accordingly, this height sensor may be a barometric sensor or a barometric air pressure sensor that may measure atmospheric pressure, which may be indicative of an altitude or height. This barometric pressure sensor data may be utilized, for example, to determine a height of a smart wheel from a point of reference such as a road and/or relative to other smart wheels of a vehicle. This may allow for determination of roll over risk or a flat tire. As noted above, height sensors on a smart wheel may be on a rotatable component of a wheel and thus not on a chassis of a vehicle. Thus, such height sensors may be able to provide barometric pressure sensor data on which side (e.g., which smart wheel) initiated a roll over (e.g., when such barometric pressure sensor data is produced and recorded in a continuous or semi continuous manner). Furthermore, road conditions, such as pot holes, can be more accurately sensed by barometric sensor data produced by a smart wheel, in comparison to sensor data produced from a static part of a chassis of a vehicle. In some embodiments, the height sensor is configured to also measure a deflection of an inner tire surface due to vehicle loads or a contact patch. In some embodiments, a distance measuring sensor can be placed into the pressurized portion of a tire. As the tire rotates, the distance of the tire relative to the central rotating rim changes. This periodic change of distance is detectable. In some embodiments, road conditions such as pot holes or other factors causing changes in a force applied in the bead area of the tire can be sensed by a significant change of the signals generated by a sensing component in an energy harvesting module.

In further embodiments, the sensor housing may include an acoustic sensor configured to produce acoustic sensor data. Accordingly, this acoustic sensor may be any type of acoustic, sound, or vibrational sensor such as a geophone, a microphone, a seismometer, and a sound locator, and the like. The acoustic sensor data may be utilized for audio pattern recognition, such as to sense an audio signature of a brake or a rotor of a rotatable component (e.g., a wheel). This may be used for predicting a vehicle servicing schedule and/or to produce performance optimization data. In some embodiments, the acoustic sensor data may be analyzed to identify and/or monitor for unique signatures for different breaking and wear out conditions, for example.

In various embodiments, the sensor housing may include an image sensor configured to produce image sensor data from variable attenuation of waves. Examples of image sensors may include are semiconductor charge-coupled devices (CCD) or active pixel sensors in complementary metal-oxide-semiconductor (CMOS) or N-type metal-oxide-semiconductor (NMOS) technologies. In various embodiments, a device platform that includes an image sensor may include a lens, or other transparent medium on which the light waves are focused from outside of the sensor housing onto the image sensor. In particular embodiments, this image sensor may include a time of flight (TOF) sensor to capture time of flight data that may characterize a TOF. This TOF sensor may be, for example, an ultrasonic TOF sensor configured to collect ultrasonic TOF sensor data. As a more specific example, an image sensor may function as a camera for determination of a visibility of tire tread depth for assessment of tire performance and optimization. Such an image sensor that captures image data characterizing a tire tread depth may also be positioned in a manner such that image data of a tire tread may be captured (e.g., by having such an image sensor capture image data characterizing a tread depth of a smart tire that the image sensor is located on, or of a tire that the image sensor is not located on). In accordance with various embodiments, the location of the image sensor can be either inside or outside of the rim such that the sensor can image the sidewall of the tire. In either case, the image sensor can be electrically coupled to the energy harvester. As another specific example, an image sensor may include an infrared image sensor for authentication or identification. This infrared sensor may be utilized, for example, to scan for characteristics of a local environment or local object (e.g., a person approaching a vehicle) for authentication.

In particular embodiments, the sensor housing may include a gas sensor configured to produce gas sensor data. This gas sensor may be any type of sensor to monitor and characterize a gaseous atmosphere. For example, the gas sensor may utilize any of a variety of mechanisms for gas detection, such as an electrochemical gas sensor, a catalytic bead gas sensor, a photoionization gas sensor, an infrared point gas sensor, a thermographic gas sensor, a semiconductor gas sensor, an ultrasonic gas sensor, a holographic gas sensor, and the like. These gas sensors may, for example detect for certain types of gases, such as exhaust gases, explosive gases (e.g., for battery failure detection), atmospheric humidity, air quality, particulates, a pH level, and the like.

In particular embodiments, the sensor housing may include a magnetic sensor configured to produce magnetic sensor data. This magnetic sensor maybe, for example, a magnetometer that measures magnetism for navigation using magnetic field maps (e.g., inside a building or within a closed environment).

In additional embodiments, the sensor housing may include an accelerometer sensor configured to produce acceleration sensor data and/or a gyroscope sensor configured to produce gyroscopic sensor data. This acceleration sensor data and/or gyroscopic sensor data may be utilized for navigation, such as to determine an amount of acceleration for the application of emergency brake systems. In certain embodiments, the accelerometer sensor and/or gyroscope sensor may be part of an inertial navigation system (INS) located on a smart wheel.

The energy harvester 306 may be positioned along the rotatable component 308 (e.g., a rim) of the smart wheel 300 in a manner configured to capture a kinetic energy in response to a compressive force acting on a flexible component 310 (e.g., a pneumatic or inflatable tire, tube, etc.) of the smart wheel 300 making contact with a road or object as the rotatable component 308 rotates. In certain embodiments, the energy harvester 306 and/or the device platform 302 may be visible from a lateral side of a vehicle or smart wheel 300 (e.g., adjacent a lateral sidewall of the vehicle or smart wheel 300). However, in other embodiments, the energy harvester 306 and/or the device platform 302 may not be visible from the lateral side of the vehicle or smart wheel 300. The energy harvested by the energy harvester 306 may be used to power various components of the device platform 302, such as various sensors and/or communication interfaces within the sensor housing 304, as described in further detail below.

In various embodiments, the energy harvester 306 may be positioned on a side wall of the rotatable component 308. For example, the energy harvester 306 may be positioned between a bead area of the flexible component 310 (e.g., a tire, tube, belt, etc.) and the rotatable component 308 (e.g., a rim, shaft, etc.). Accordingly, the flexible component 310 may be mounted on the rotatable component 308. The energy harvester 306 may generate energy resulting from a compressive force acting on the bead area of the flexible component 310 (e.g., tire, tube, etc.) as the vehicle travels over a surface (e.g., a road).

Figure 3B:
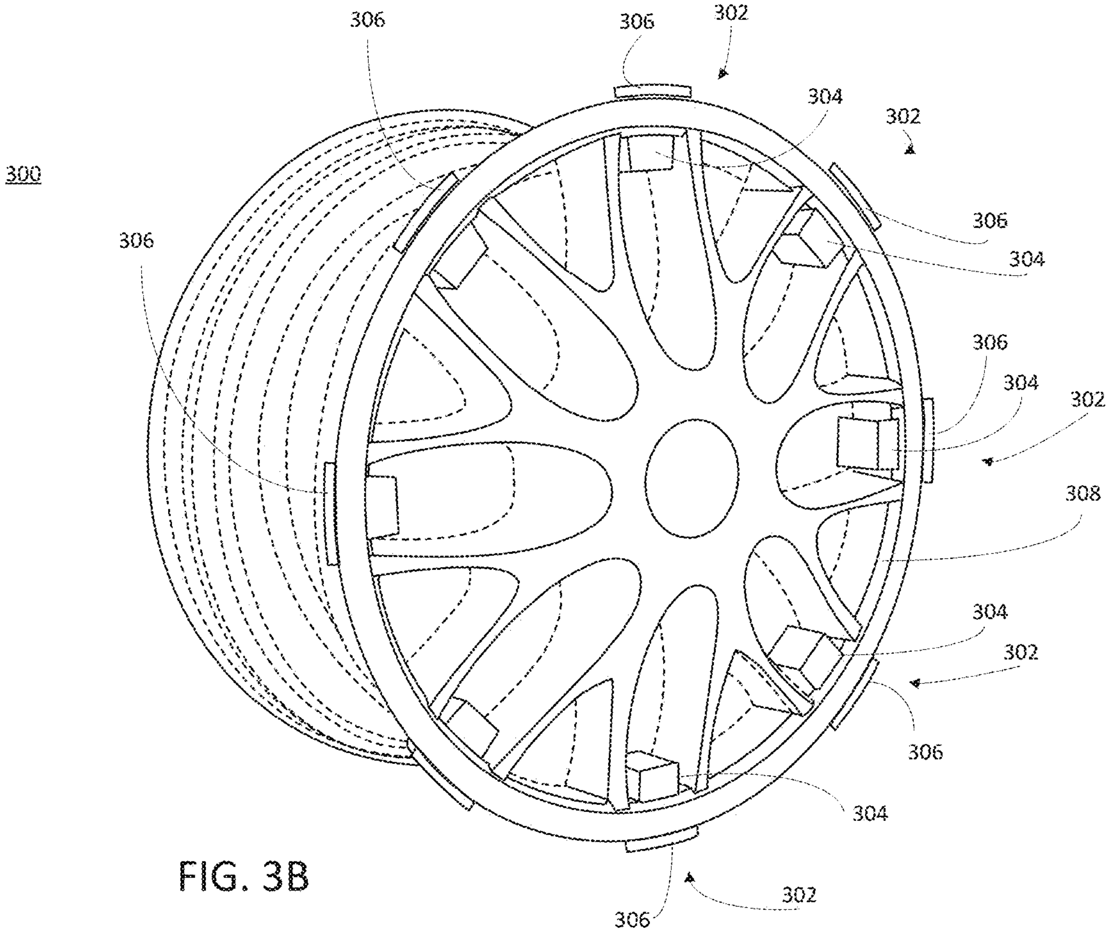
FIG. 3B is a perspective illustration of the smart wheel without the flexible component, in accordance with various embodiments.

FIG. 3B is a perspective illustration of the smart wheel 300 without the flexible component, in accordance with various embodiments. As illustrated, the energy harvester 306 may be positioned around a circumference of the rotatable component 308. Accordingly, the energy harvester 306 may generate energy resulting from a compressive force of a moving object (e.g., a vehicle, acting on the bead area of the tire mounted on the rotatable component 308). In some embodiments, the compressive force may be due to loading (e.g., acceleration, deceleration, etc.). As such, the location of the compressive force may vary depending on the loading. In further embodiments, the energy harvester 306 may capture a kinetic energy of the transport moving in response to the rotatable component 308 rotating. Accordingly, the energy harvester 306 may generate energy when mechanical stress is applied to the energy harvester 306.

Figure 4A:
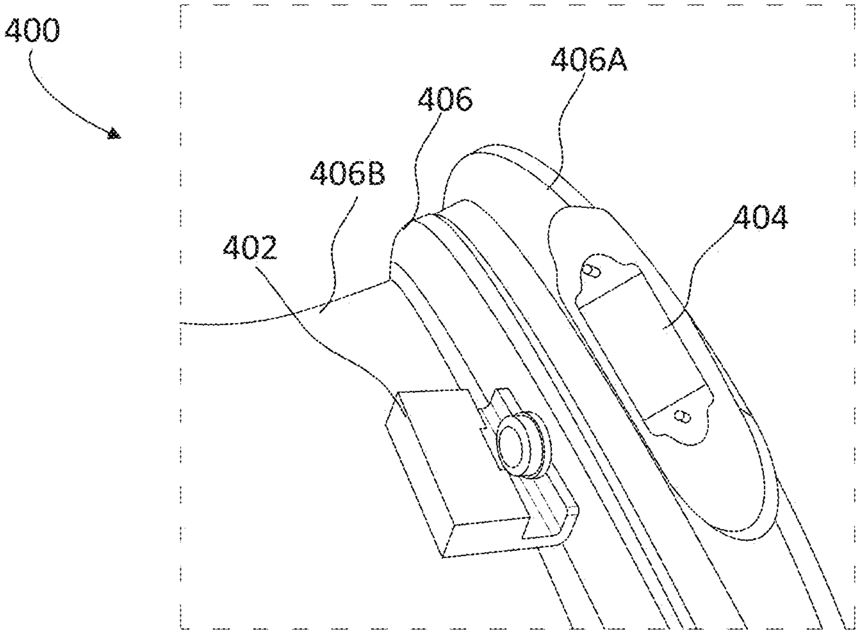
FIG. 4A illustrates an electrical interface system, in accordance with various embodiments.

FIG. 4A illustrates an electrical interface system 400, in accordance with various embodiments. The electrical interface 400 may include an electronic module 402 and an energy harvesting (EH) module 404. In some embodiments, the electronic module 402 is placed adjacent to a center area 406B of a rotatable component 406 (e.g, a wheel), and the EH module 404 is placed on or adjacent to a peripheral edge or rim area 406A of the rotatable component 406. Although the electrical interface system 400 illustrated in FIG. 4A includes one electronic module 402 and one EH module 404, any number of electronic modules and EH modules may be implemented in the electrical interface system 400 as desired for different applications in various embodiments. For example, other embodiments may include multiple electronic modules for each EH module and yet further embodiments may include multiple EH modules for each electronic module. Although certain embodiments describe the EH module 404 as being located directly on the rim 406A of the rotatable component 406, the EH module 404 may also be located in other parts of rotatable component 406 as desired for different applications in various embodiments. In some embodiments, the EH module 404 comprises at least one EH component configured to convert a force acting on the EH component into electrical signals. In some embodiments, the electrical signals provide energy to at least one sensor disposed within a tire coupled to the rotatable component 406. In some other embodiments, the EH module 404 comprises at least one piezoelectric component, wherein the at least one piezoelectric component is configured to produce energy in response to mechanical strain imparted on the at least one piezoelectric component, wherein the at least one piezoelectric component is configured to deform while experiencing the mechanical strain. In some embodiments, the signal produced by the piezoelectric component can be used to sense a parameter or condition of a wheel or tire mounted on the wheel (e.g., sudden increase in force due to a pothole, sudden increase in forces or temperature due to sudden breaking, flat, etc.). In further embodiments, the EH module 404 comprises at least one sensing component configured to convert at least one physical parameter to electric signals. Examples of the at least one physical parameter include barometric pressure, temperature, vehicle movement speed, tire micro plastic particle density, sidewall temperature of a tire, tire pressure, etc.

Figure 4B:
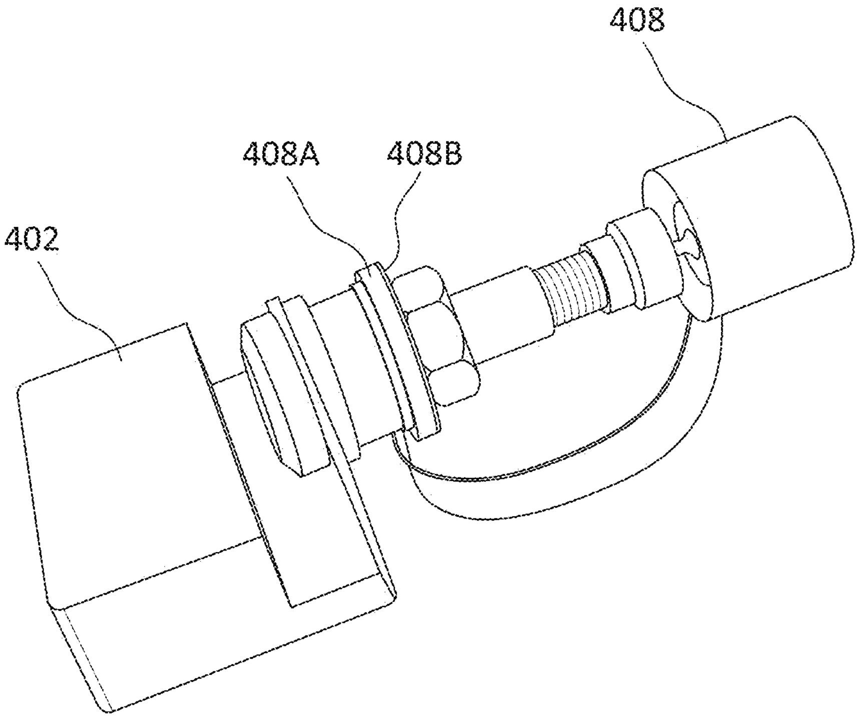
FIG. 4B illustrates an example of an electronic module connected to a valve stem, in accordance with various embodiments.

In some embodiments, the electronic module 402 is operatively connected to the EH module 404 to collect, store and use energy harvested from the EH module 404. In one example, the electronic module 402 is connected to the EH module 404 via an interconnect structure that is integrated with a valve stem of a tire, which can be referred to herein a "valve stem interconnect structure." FIG. 4B illustrates an example of an electronic module 402 connected to a valve stem interconnect structure 408, in accordance with various embodiments. The valve stem interconnect structure 408 may include a ring-shaped grommet 408A configured to surround a base 408B of the valve stem interconnect structure 408.

In some embodiments, the valve stem interconnect structure 408 may be implemented using existing industry standard geometries of a typical valve stem such as a Schrader valve in order to be compatible with standard wheels.

Figure 4C:
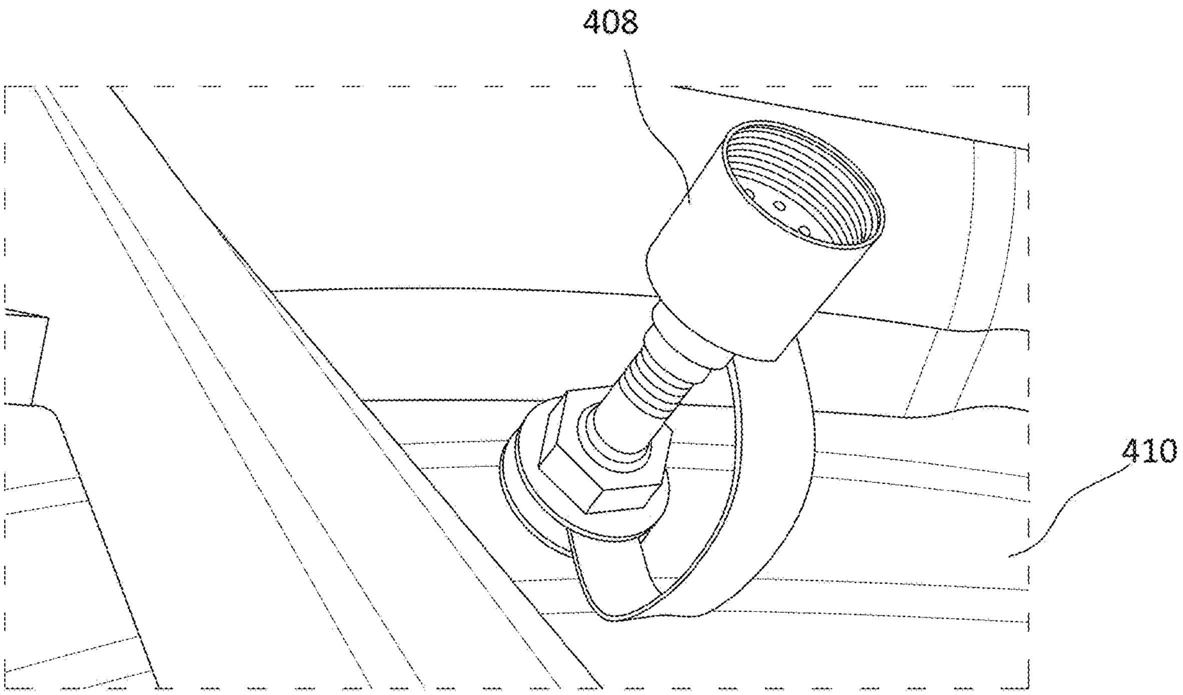
FIG. 4C illustrates an example of a valve stem implemented on a wheel, in accordance with various embodiments.

FIG. 4C illustrates an example of the valve stem interconnect structure 408 mounted on a wheel 410, in accordance with some embodiments. As shown in FIG. 4C, the valve stem interconnect structure 408 extends through a valve stem hole in the wheel 410 and provides the functions of a conventional valve stem for tire inflation and pressure maintenance, in addition to providing an electrical interconnect for power and data signaling between electronic components mounted on the wheel (either external or internal to a pressurized area of the tire) and one or more remote electronic devices and systems, as described in further detail below. In some embodiments, the valve stem interconnect structure 408 can be used for extending wireless communications range (or directing in a particular location) of internal devices in the pressurized area of the wheel 410 by a plurality of antennas placed outside the wheel 410 using impedance matched strip-lines or micro coaxial cables, as described in further detail below.

Figure 4D:
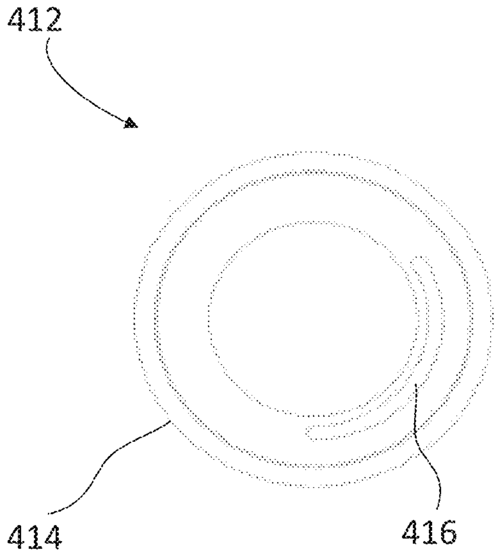
FIG. 4D illustrates a top image and a top view of an exemplary grommet in the valve stem, in accordance with various embodiments.

FIG. 4D illustrates a top view 412 of an exemplary grommet 414 that can be used in the valve stem interconnect structure 408, in accordance with various embodiments. In some embodiments, the grommet 414 is a ring-shape grommet and comprises a slit 416 configured to allow a printed circuit board (PCB) cable to pass through so as to electrically couple the electronic module 402 and/or the EH module 404 to an electrical interface 424, which is described in further detail below with reference to FIG. 4F.

Figure 4E:
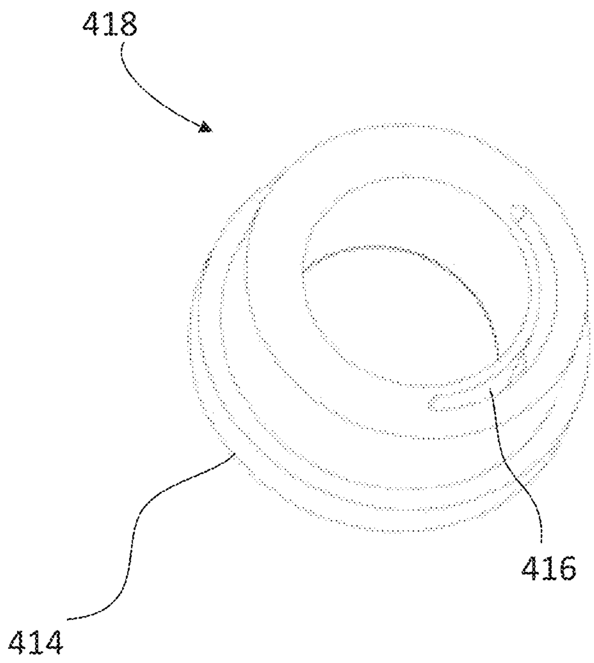
FIG. 4E illustrates an isometric image and an isometric view of the exemplary grommet, in accordance with various embodiments.

FIG. 4E illustrates a perspective view 418 of the grommet 414 illustrated in FIG. 4D. The functions of the grommet 414 and the slit 416 are described above with reference to FIG. 4D and are, therefore, not repeated here.

Figure 4F:
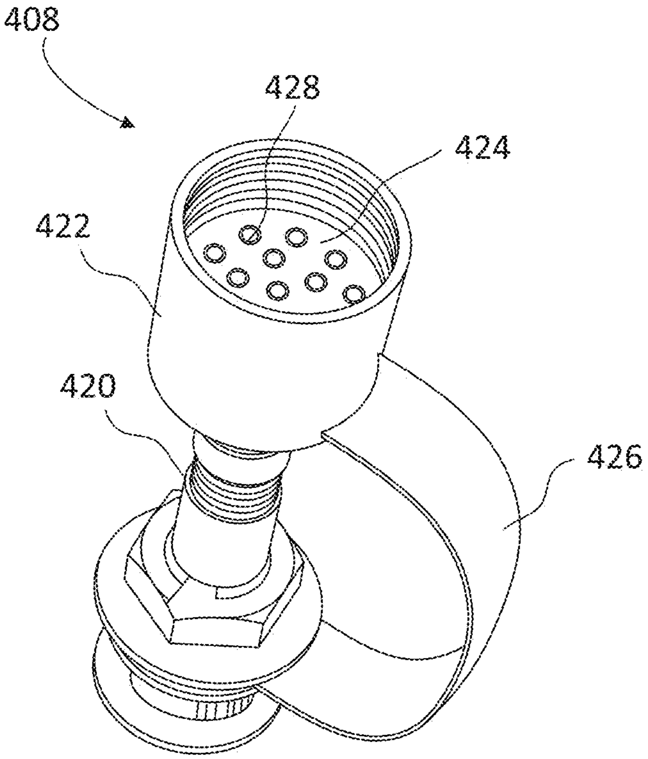
FIG. 4F illustrates another example of the valve stem, in accordance with various embodiments.

FIG. 4F illustrates a perspective view of the valve stem interconnect structure 408 when it is decoupled from the wheel 410, in accordance with various embodiments. The valve stem interconnect structure 408 includes an electrical interface 424 housed in a cylindrical housing 422 that is configured to mate with an external electrical connector (not shown). The electrical interface 424 includes a plurality of female connection receptacles 428 configured to mate with a plurality of male pin connectors of the external electrical connector. In alternative embodiments, the plurality of female connection receptacles 428 can be replaced by plurality of male pin connectors 428 configured to mate with a plurality of female connection receptacles of an external electrical connector. Each of the connection receptacles 428 are electrically coupled to a respective one of a plurality of conductors housed by an external flex printed circuit board (PCB) cable 426 at one end of the flex PCB cable 426. The other end of the flex PCB cable 426 passes through the slit 416 of grommet 414 to electrically couple the plurality of conductors of flex PCB cable 426 to an electrical interface that is disposed in a pressurized area of the tire on an opposite side of a wall of the wheel 410, as described in further detail below in connection with FIG. 4G.

In some embodiments, the circular electrical interface 424 is configured to interface with an electrical connector of the EH module 404. The external flex PCB 426 may be referred to as a PCB that is created out of materials that can bend, resulting in improved resistance to vibrations and movement. In some embodiments, the external flex PCB 426 is coupled to the circular electrical interface 424 and the electronic module 402 and functions as an interface between the electronic module 402 and the EH module 404. The external flex PCB 426 may comprise an environmental protection layer for protection. In some embodiments, the external flex PCB 426 comprises thin flex interconnect strips with thicknesses ranging from about 0.05 mm to 3 mm. In one example, thin flex interconnect strips in the external flex PCB 426 comprise traces designed to enter the bottom of the valve stem 420 using the slit 416. In another example, after the external flex PCB 426 is inserted into the slit 416, the slit 416 is sealed with an automotive grade encapsulant or an adhesive to maintain a pressurized seal at all times at extended temperature ranges during operation. The seal may be maintained when the wheel 410 is stationary or the wheel 410 is experiencing high g forces during rotation and turning. In yet another example, the slit 416 is soldered or welded to maintain the pressurized seal.

Figure 4G:
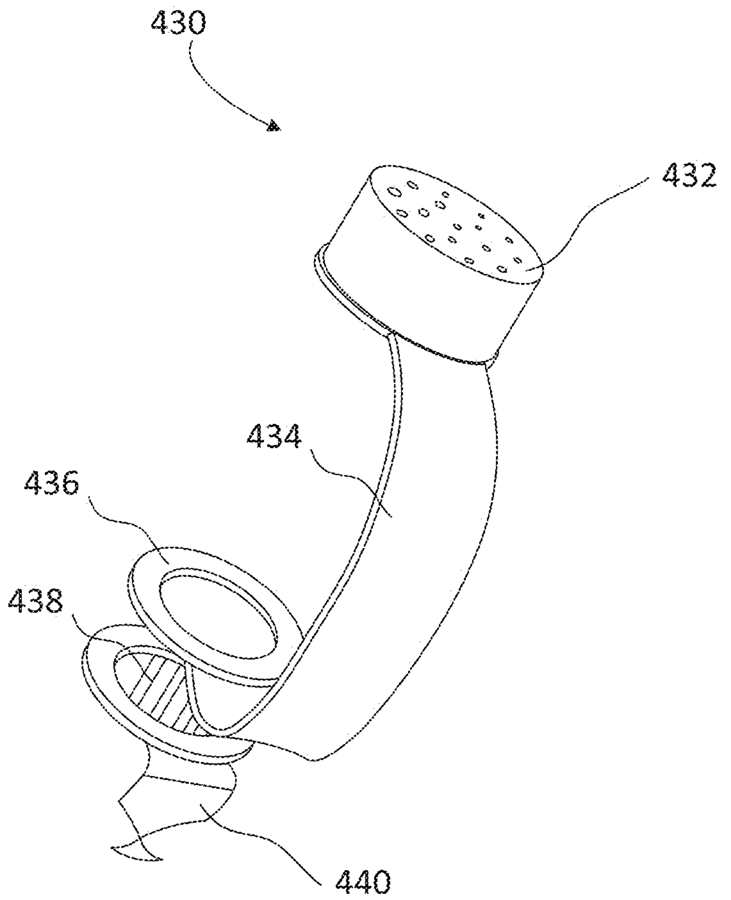
FIG. 4G illustrates an electrical interconnect structure of the valve stem, in accordance with various embodiments.

FIG. 4G illustrates an example of an electrical interconnect structure 430 of the valve stem interconnect structure 408, in accordance with various embodiments. The electrical interconnect structure 430 may include a circular electrical interface 432, an external flex PCB cable 434, one or more rigid ring PCBs 436, an in-grommet flex PCB 438, and an internal flex PCB 440. The one or more rigid ring PCBs 436 may be configured to implement air sealing functions for the valve stem interconnect structure 408. In some embodiments, the in-grommet flex PCB 438 is located in an internal area of the grommet 414 and is coupled to the external flex PCB cable 434 via the slit 416 of the grommet 414. In turn, the in-grommet flex PCB 438 is electrically coupled to the internal flex PCB 440 which extends through the valve stem hole of the wheel 410 into a pressurized area of the tire. The grommet 414 seals any portions of the hole that may otherwise allow leakage of pressurized air inside the tire. The internal flex PCB 440 is configured to provide an electrical connection to one or more electronic modules 402 located in the pressurize area of the tire in order to conduct signals (e.g., power and/or data) to and from the one more electronic modules 402 from and to an external device (e.g., one or more EH modules 404) that is coupled to the external electrical interface 432.

Figure 5A:
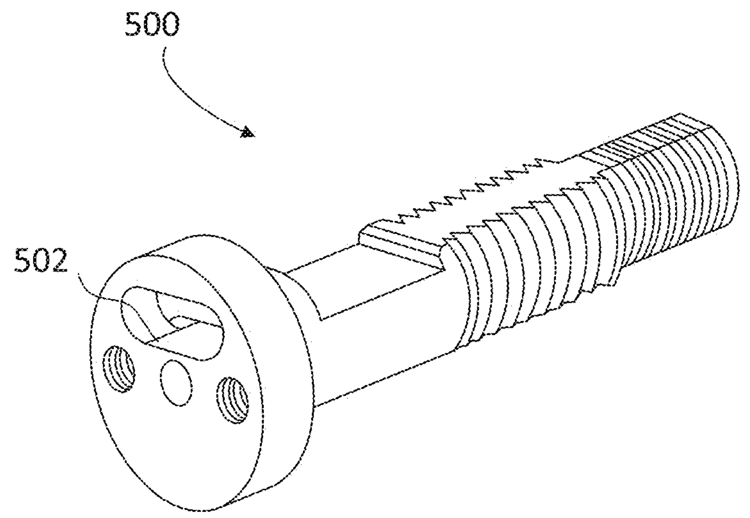
FIG. 5A illustrates another example of the valve stem, in accordance with various embodiments.

FIG. 5A illustrates another example of a valve stem interconnect structure 500, in accordance with another embodiment. The valve stem interconnect structure 500 may comprise a feedthrough passage 502 for wires, flex PCB cables, optical fiber and antenna strip lines, and/or any other physical signal conduction means. In some embodiments, the feedthrough passage 502 allows optical fiber cables to pass in addition to electrical power and data cables. The optical fiber cables passing through the feedthrough passage 502 provide very high-speed optical communication link between electronic components inside the pressurized area of the wheel 410 to the outside non-pressurized region of the wheel 410. In some embodiments, the optical fibers passing through the feedthrough passage 502 can pick up and transmit signals that are in the visible and IR spectrum wavelength of light that are transmitted (or received) from nearby external stationary or moving optical transceiver modules.

Figure 5B:
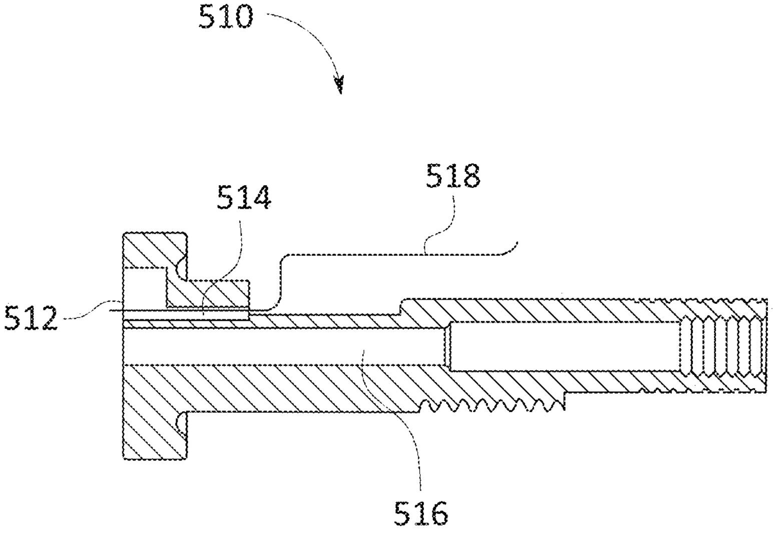
FIG. 5B illustrates a cross-sectional view of a valve stem, in accordance with various embodiments.

FIG. 5B illustrates a cross-sectional view of a valve stem 510, in accordance with various embodiments. The valve stem 510 may comprise a sealing encapsulant location 512, a feedthrough passage 514, an air orifice 516 and a signal conduction medium 518. As shown in FIG. 5B, the signal conduction medium 518 passes the feedthrough passage 514 and the sealing encapsulant location 512 is configured to receive a sealing encapsulate (e.g., a polymer, resin, etc.) that can seal any leakage points that would otherwise allow air to escape from an internal pressurized area of the tire through the feedthrough passage 514. Examples of the signal conduction medium 518 include wires, flex PCB cables, optical interconnect circuits, etc. In accordance with various embodiments, the signal conduction medium 518 passing through the feedthrough passage 514 is configured to provide reliable power and data connections between one or more electronic components inside the pressurized area of a tire mounted on the wheel 410 and one or more sensors, energy harvesters, electronic devices and/or communication modules located outside of the tire. The air orifice 518 allows for the passage of air into and out of the tire to provide conventional valve stem functionality of adjusting air pressure inside the tire.

Figure 5C:
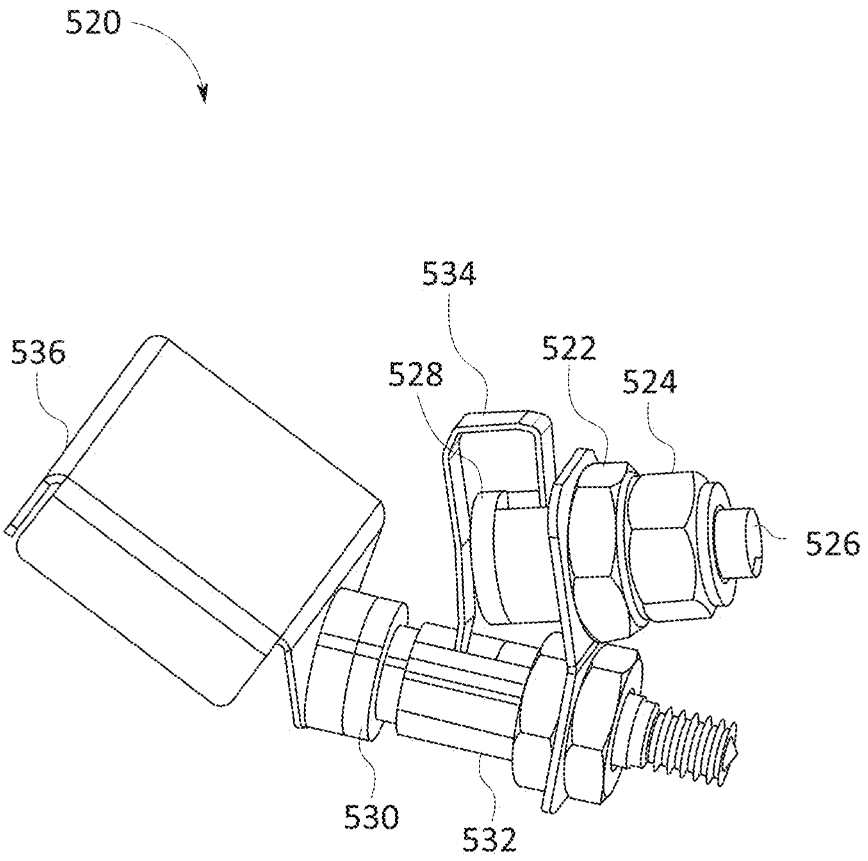
FIG. 5C illustrates an assembly view of a feedthrough valve stem, in accordance with various embodiments.

FIG. 5C illustrates a perspective assembly view of a feedthrough valve stem interconnect structure 520, in accordance with further embodiments. The feedthrough valve stem structure 520 may include a securing mechanical nut 522, an external connector 524, an external cable shroud 526, a flex PCB to circular socket connector termination 528, a sealing gasket 530, a securing bushing 532, a flex PCB cable 534 and an electronics module 536 configured to disposed inside a pressurized area of the tire when mounted on the wheel 410. The flex PCB cable 534 may pass through a feedthrough passage to provide electrical connections between circuitry and/or components within the electronics module 536 and the external connector 524 and shroud 526, in similar manner as discussed above with respect to FIG. 5B. In accordance with various embodiments, the external connector 524 and the shroud 526 can be configured to be compatible with any connector type.

Figure 5D:
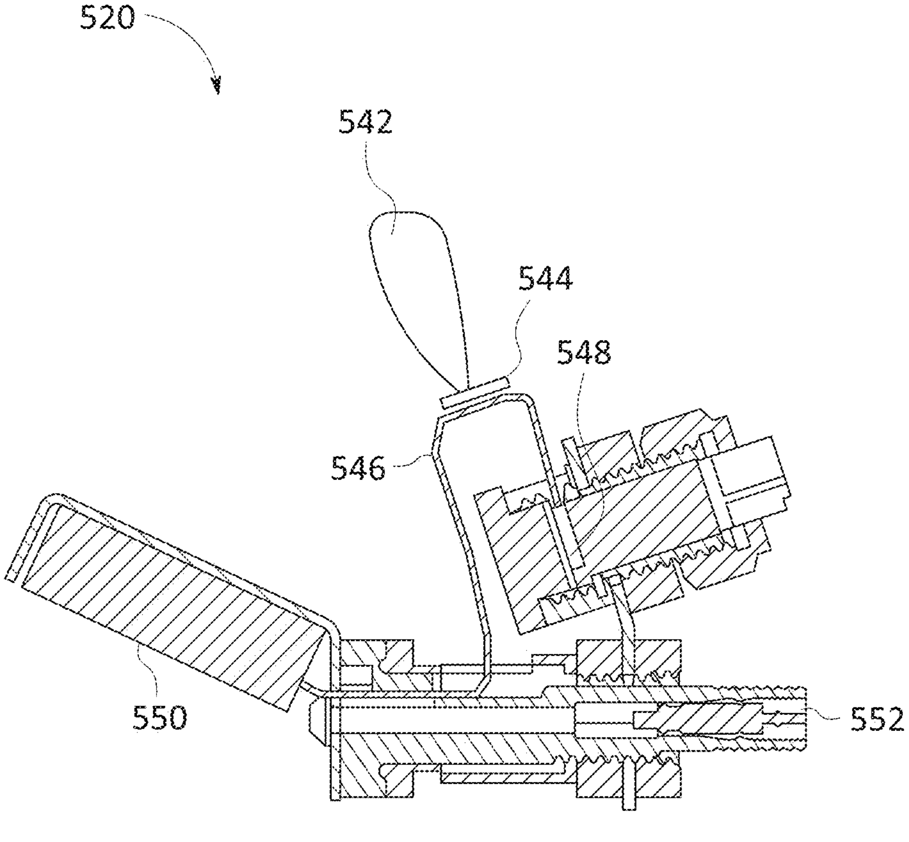
FIG. 5D illustrates a cross-sectional view of the feedthrough valve stem, in accordance with various embodiments.

FIG. 5D illustrates cross-sectional view of a feedthrough valve stem interconnect structure 520 of FIG. 5C, in accordance with various embodiments. The feedthrough valve stem interconnect structure 520 may include an antenna radiation pattern 542, a wireless antenna 544, a flex PCB interconnect circuit 546 that can include power, data and micro strip lines, a flex PCB to circular socket connector termination 548, a custom electronic module 550, an air inlet valve 552, and other components for providing valve stem functionality. The antenna radiation pattern 542 may be referred to as a graphical representation of the radiation properties of the wireless antenna 544 as a function of space. In some examples, the antenna radiation pattern 542 represents how the wireless antenna 544 radiates energy out into space or receives energy. The custom electronic module 550 may be located inside the pressurized area of the wheel 410, and may comprise processors, radio frequency (RF) communication modules, sensors, accelerometers, gyroscope energy storage, transceivers, and/or any other components.

Figure 5E:
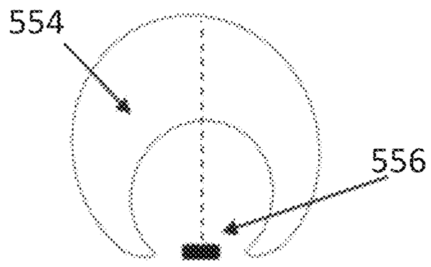
FIG. 5E illustrates a top cross-sectional view of an antenna radiation pattern for a wireless antenna in the feedthrough valve stem, in accordance with various embodiments.

FIG. 5E illustrates an example of a top cross-sectional view of an antenna radiation pattern 554 for a wireless antenna 556 in the feedthrough valve stem interconnect structure 520, in accordance with various embodiments. In one example, the wireless antenna 556 is a directional antenna. In another example, the wireless antenna 556 is an omnidirectional antenna.

Figure 6A:
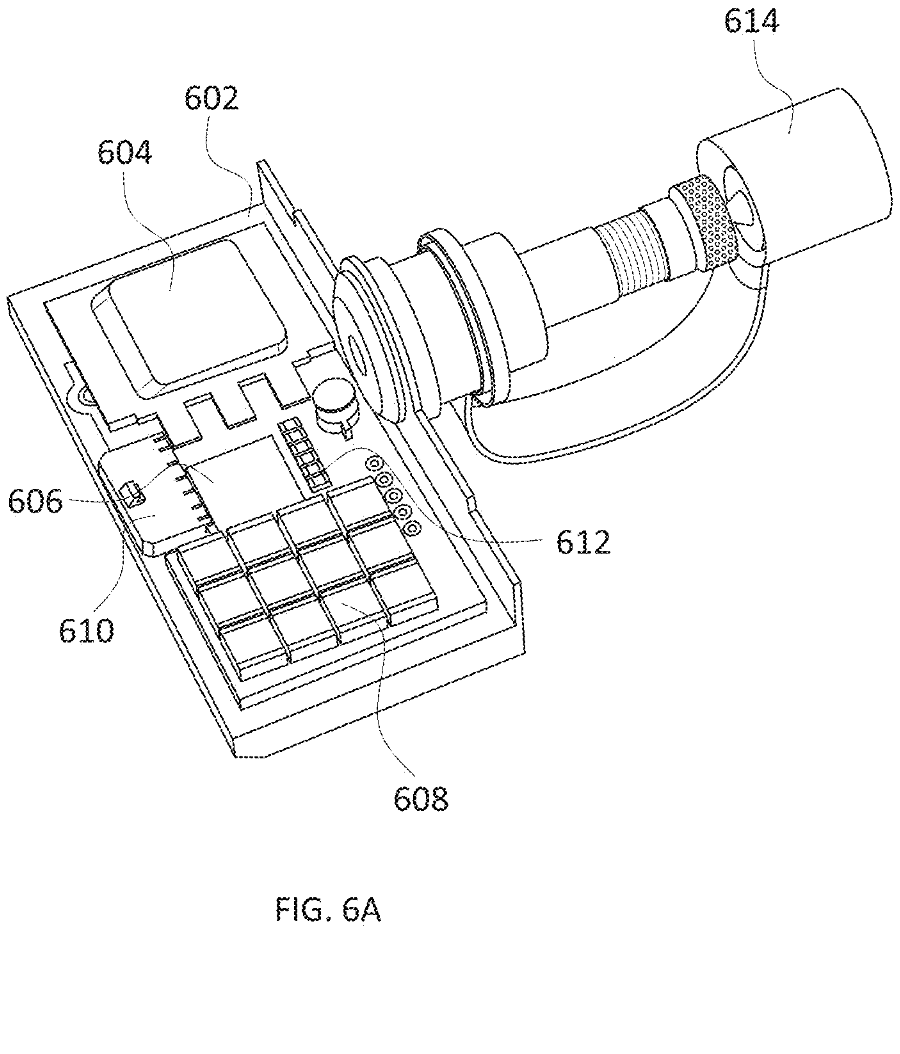
FIG. 6A illustrates another example of an electronic module in connection with a valve stem in the electrical interface system, in accordance with various embodiments.

FIG. 6A illustrates another example of an electronic module 602 coupled to a valve stem interconnect structure 614, in accordance with various embodiments. In some embodiments, the electronic module 602 comprises an electric double layer capacitor (EDLC) energy storage element 604, a power management control integrated circuit (IC) 606, one or more high voltage input multilayer ceramic capacitors (MLCCs) 608, an electrical interconnect module 610 for in-tire power delivery, one or more low voltage output MLCCs 612, in addition to other components (not shown). The EDLC energy storage element 604 may be referred to as an electric energy storage system based on charge—discharge process in an electric double layer on porous electrodes. In some embodiments, the EDLC energy storage element 604 is used as a secondary energy storage device or a memory back-up device because of its high cycle efficiencies and long life-cycles. In some embodiments, the electronic module 602 is configured to receive energy harvested from the EH module 404 and store the energy inside the electronic module 602. In some other embodiments, the electronic module 602 is configured to transfer energy to various sensors in the smart wheel sensor system 100 and provide electrical power for various in-tire components in the smart wheel sensor system 100. The valve stem interconnect structure 614 may be similar to one or more of the valve stem interconnect structures described above with reference to FIGS. 4A to 5E and, therefore, its description is not repeated here.

Figure 6B:
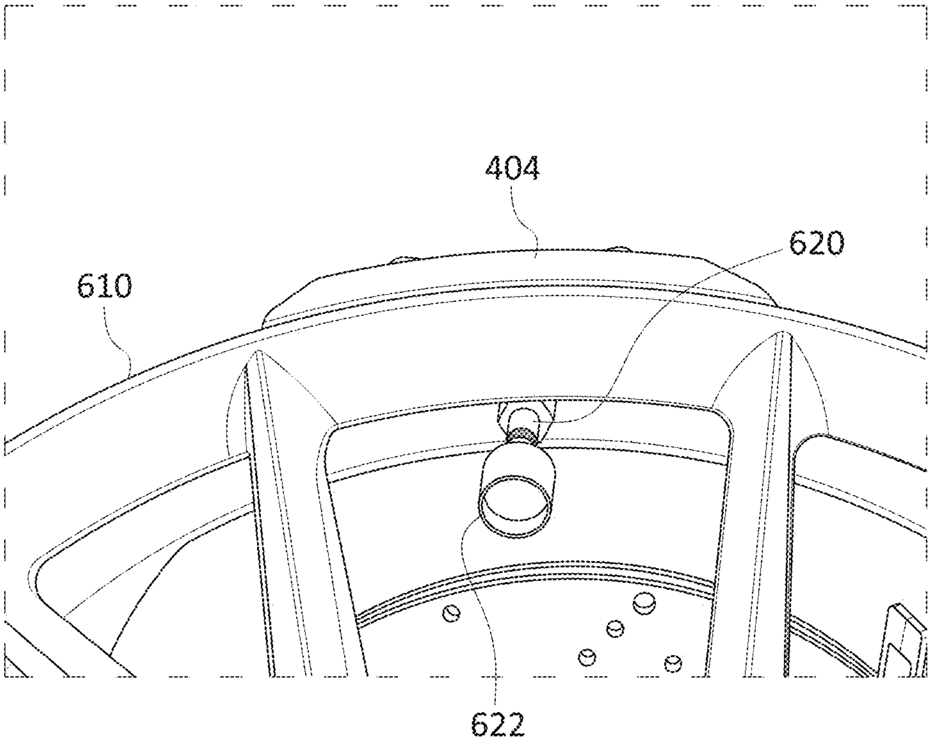
FIG. 6B illustrates an example of an air inlet valve stem in connection with an external electrical connector, in accordance with various embodiments.

FIG. 6B illustrates an example of a valve stem interconnect structure 620 coupled to a wheel 610, in accordance with some embodiments. The valve stem interconnection structure includes an external electrical connector 622, in accordance with various embodiments. In some embodiments, the external electrical connector 622 is connected to the EH module 404 to provide electrical connections for power and data transfer between the EH module 404 and various components of the smart wheel sensor system 100 such as sensors, processors, and transceiver modules, etc. In some embodiments, the EH module 404 may be disposed between a bead area of the tire (not shown) and circumferential edge of the wheel 610 in order to convert compressive forces acting on the bead area of the tire into energy. The compressive forces are due to the weight of a vehicle supported by the tire as the tire rotates (i.e., the vehicle is in motion). In accordance with some embodiments, the external electrical connector 622 is a standard M16 circular metric connector.

Figure 7:
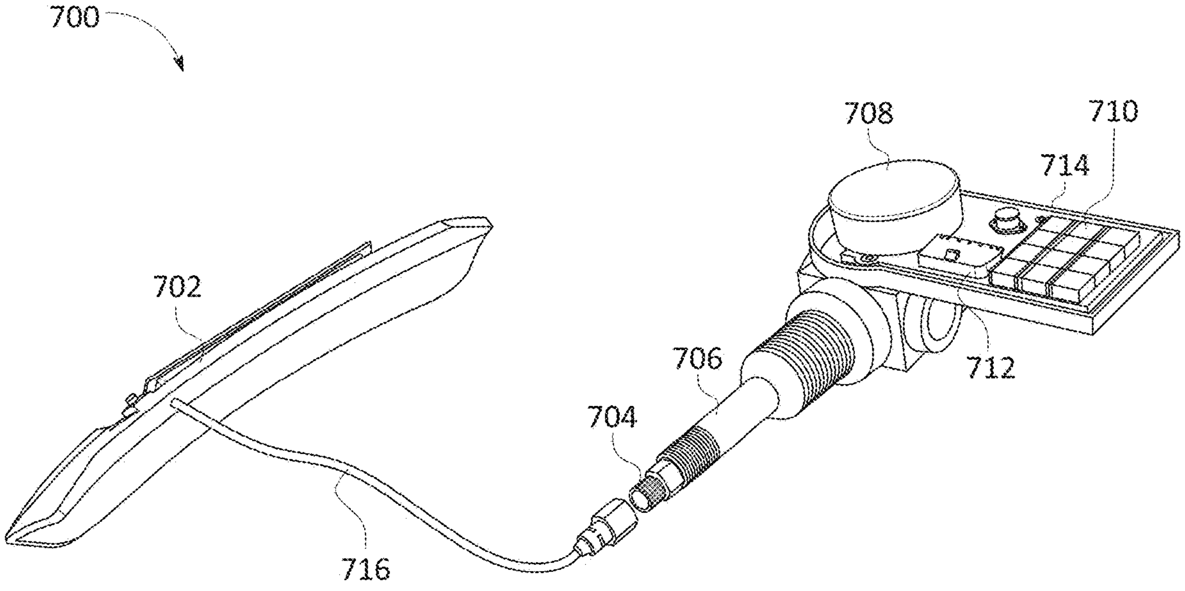
FIG. 7 illustrates an energy harvesting and in-tire power conditioning module connectivity diagram, in accordance with various embodiments.

FIG. 7 illustrates a smart wheel electronics assembly 700, in accordance with various embodiments. The smart wheel electronics assembly 700 may include an EH module 702, an EH power connector 704, a Schrader valve 706, a backup battery 708 for an electronic module 714, which further includes a capacitor bank 710, and an in-tire power output connector 712. The assembly 700 further includes a signal cable 716 that electrically couples the EH module 702 to the EH power connector 707, and hence to the electronic module 714. The Schrader valve 706 may be referred to as a type of pneumatic tire valve comprising a valve stem into which a valve core is threaded. In some embodiments, the Schrader valve 706 is implemented in the valve stem interconnect structure 408 described above and provides conventional air valve stem functionality in the smart wheel sensor system 100. In some embodiments, the EH power connector 704 is placed inside the Schrader valve 706.

The capacitor bank 710 may be used as a storage component for battery-less storage of energy transferred by the signal line 716 from the EH module 702 to the EH power connector 704. In some embodiments, the signal line 716 is further used for communication power and data between the EH power connector 704 and the electronic module 714. Examples of the signal line 716 include wires, flex PCB cables, optical interconnect circuits, and/or any other types of communication mediums.

Figure 8A:
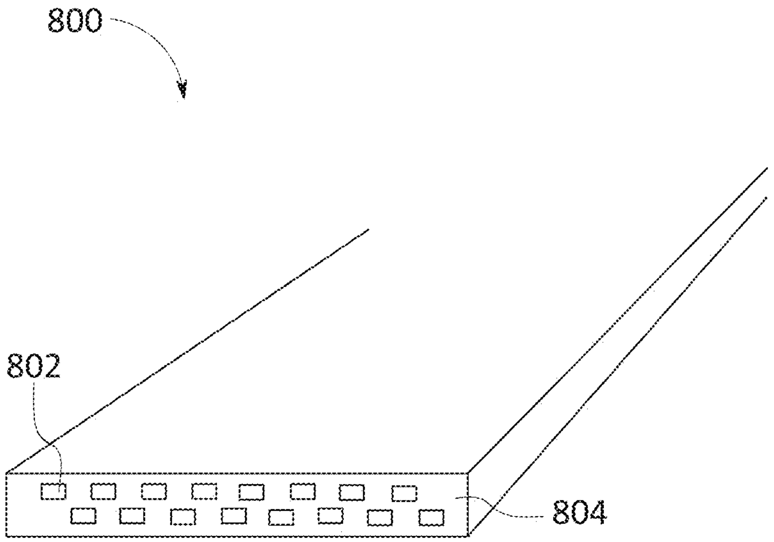
FIG. 8A illustrates a cross-sectional view of a communication channel used for communication between an energy harvesting (EH) power connector and an electronic module, in accordance with various embodiments.

FIG. 8A illustrates an example of a cross-sectional view of a communication channel 800 used for communication between the EH module 702 and the electronic module 714 of FIG. 7, in accordance with various embodiments. The communication channel 800 may be used as the signal line 716 of FIG. 7 and provide at least one of the following functions: power transfer, data transfer, optical transmission, and RF signal transmission. In some embodiments, the communication channel 800 comprises a plurality of conductors 802, and an insulation matrix 804. In accordance various embodiments, different subsets of the plurality of conductors 802 can provide different functions such as power transfer, data transfer, RF signal transmission, etc.

Figure 8B:
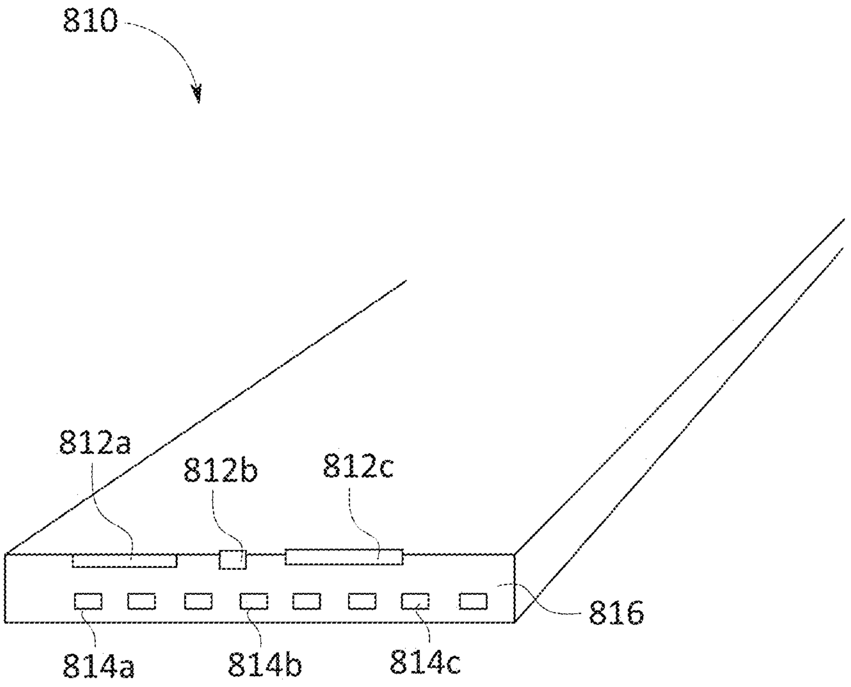
FIG. 8B illustrates another example of a cross-sectional view of a communication channel used for communication between the EH module and the electronic module, in accordance with various embodiments.

FIG. 8B illustrates another example of a cross-sectional view of a communication channel 810 used for communication between the EH module 702 and the electronic module 714, in accordance with various embodiments. The communication channel 810 may comprise one or more RF antenna traces 812*a*, 812*b*, 812*c* as shown, one or more conductors 814*a*, 814*b*, 814*c* as shown, and an insulation matrix 816. The one or more RF antenna traces 812*a*-812*c* may provide a single channel or multiple channels carrying different frequencies. In one example, the one or more conductors 814*a*, 814*b*, 814*c* are configured to transmit power between the EH power connector 704 and the electronic module 714. In another example, the one or more RF antenna traces 812*a*, 812*b*, 812*c* are configured to transmit RF signals. In yet another example, the one or more RF antenna traces 812*a*, 812*b*, 812*c* and the one or more conductors 814*a*, 814*b*, 814*c* are designed to enter a bottom of the valve stem 420 using a tiny slit opening that is placed adjacent to an air inlet hole, as described above.

In some embodiments, micro strip line antennas (or micro coaxial cables) can be implemented for matched impedance between wireless radio transceivers and antennas. There can also be differential lines and traces that compensate local noise and improve gain and signal transmission performance. Furthermore, antennas can be placed on the flex circuit at the termination of the micro strip lines in orientations that allow for efficient wireless data transmission in all planes. This can be orthogonal to the wheel 410 (facing inwards or outwards direction) providing directional electromagnetic radiation patterns, or parallel to the wheel providing Omni direction radiation patterns. This allows for a low power wireless communication and can be used to extend the wireless communication range and bandwidth of electronic devices mounted on the wheel (either inside a pressurized are of a tire or outside of the tire) for high-speed communications.

Figure 8C:
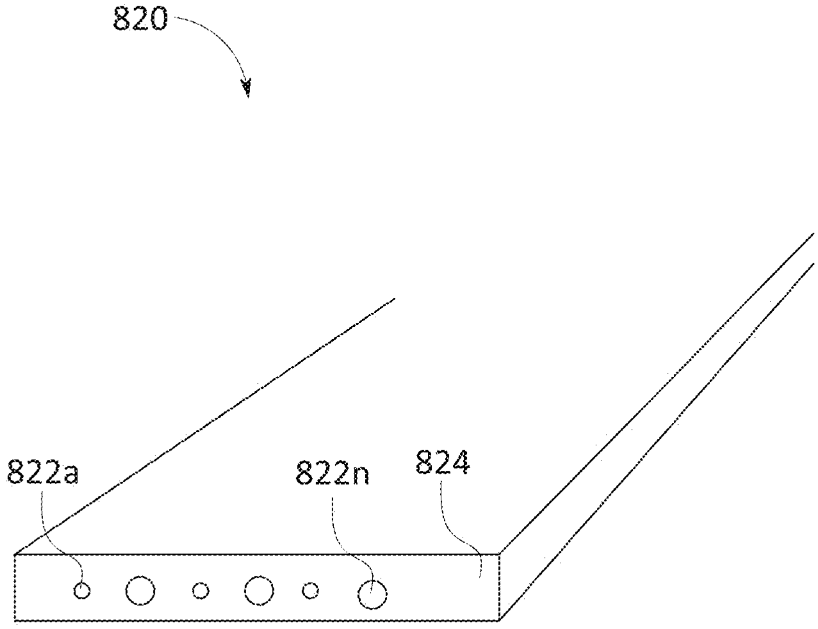
FIG. 8C illustrates yet another example of a cross-sectional view of a communication channel used for communication between the EH module and the electronic module, in accordance with various embodiments.

FIG. 8C illustrates yet another example of a cross-sectional view of a communication channel 820 used for communication between the EH module 702 and the electronic module 714, in accordance with various embodiments. The communication channel 820 may comprise at least one electrical cable 822*a* and at least one optical fiber 822*n* as shown, an insulation matrix 824, and/or any other components. In some other embodiments, the at least one electrical cable 822*a* carries electrical signals which can be either data signals or power signals, and the at least one optical fiber 822*n* carries optical signals. In some embodiments, the at least one optical fiber 822*n* provides very high-speed optical communication link between the EH module 702 and the electronic module 714. In some other embodiments, the EH module 702 includes an optical sensor or is replaced by an optical sensor module 702 configured to detect light in the visible and infrared (IR) spectrum wavelength of light that are transmitted (or received) from nearby external stationary or moving optical transceiver modules. Such detected optical signals can then be transmitted via the at least one optical fiber 822*n* to the electronic module 714 for further processing by one or more processors contained in the electronic module 714. In some embodiments, the detected optical signals are received in EH module 702 and are then converted to electrical signals by at least one electro-optic transceiver in the EH module 702.

Figure 9:
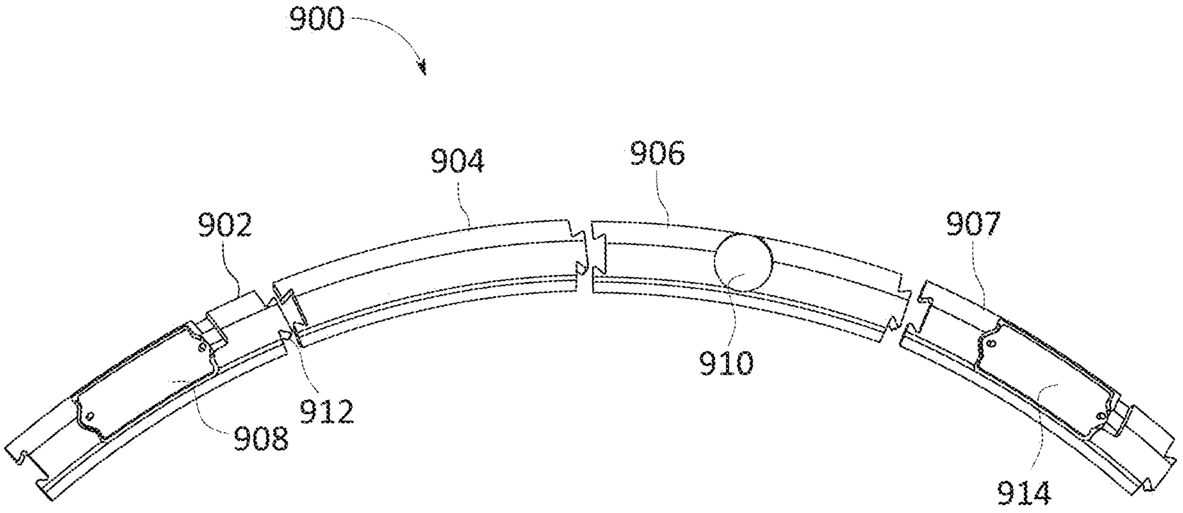
FIG. 9 illustrates an example of an interconnect ring topology, in accordance with various embodiments.

FIG. 9 illustrates an example of a ring interconnect topology 900 for various energy harvesting modules, sensors and other electronic devices such as wireless and optical transceivers attached to a circumferential surface of the wheel 410, in accordance with various embodiments. Although four modules of the ring interconnect topology 900 are shown in FIG. 9, the ring interconnect topology 900 can comprise any number of modules and can span along the entire circumferential surface of the wheel 410 (i.e., 360 degrees) to form a continuous ring or only a portion thereof to form a partial ring. In some embodiments, the ring interconnect topology 900 comprises one or more active EH modules 902, one or more dummy modules 904, one or more dummy cavity modules 906, one or more sensor modules 907, and can include other types modules, sensors or components for various applications.

Each of the one or more active EH modules 902 includes one or more EH components 908, each one of the sensor modules 907 includes one or more sensors 914, and each of the one or more dummy cavity modules 906 includes one or more electronic modules 910. In accordance with various embodiments, the EH components 908 can be similar to, or the same as, those disclosed in U.S. Pat. No. 11,325,432 or U.S. Publication No. 2021/0028725 A1, which are each incorporated by reference herein in their entireties. In accordance with various embodiments, the one or more electronic modules 910 may have some or all of the components of the electronic module 602 described above with reference to FIG. 6A. Further, in accordance with various embodiments, the one or more sensors 914 can include various types of sensors such as accelerometers, temperature sensors, etc. for measurements various types of physical parameters depending the application desired. The various active, dummy and dummy cavity modules in the ring interconnect topology 900 can be connected using one or more mechanical interfaces 912. In some embodiments, the one or more active EH modules 902 are configured to integrate the one or more EH components 908 and/or the one or more sensors 914 so that the one or more active EH modules 902 can generate power and/or act as a sensor. In one example, the one or more electronic modules 910 can store energy harvested from the one or more EH components 908 and transfer the harvested energy to the one or more sensors 914.

In some embodiments, the one or more active EH modules 902, the one or more dummy modules 904, and the one or more dummy cavity modules 906, when combined together in the ring interconnect topology 900, can improve flat tire performance and reliability by minimizing non-uniform tire deformation under load. In some other embodiments, the ring interconnect topology 900 is environmentally robust that can handle wide temperature ranges and g forces due to rotation of the wheel 410.

In some embodiments, the one or more dummy modules 904 and the one or more dummy cavity modules 906 can provide a necessary mechanical structure for placement of interconnect modules as well as power management electronics modules needed for operations of the smart wheel sensor system 100. The one or more dummy modules 904 and the one or more dummy cavity modules 906 may also provide mechanical interface for connection so that the ring interconnect topology 900 remains continuous without break. Implementation of the one or more dummy modules 904 and the one or more dummy cavity modules 906 may also improve reliability of the one or more active EH modules 902, and improve balance of tire. In some embodiments, the one or more dummy cavity modules 906 may be used for interconnects and electronic integration in the smart wheel sensor system 100, such that energy generated from each of the one or more EH modules 908 is transmitted through the one or more dummy cavity modules 906 to the one or more sensor modules 914.

Figure 10:
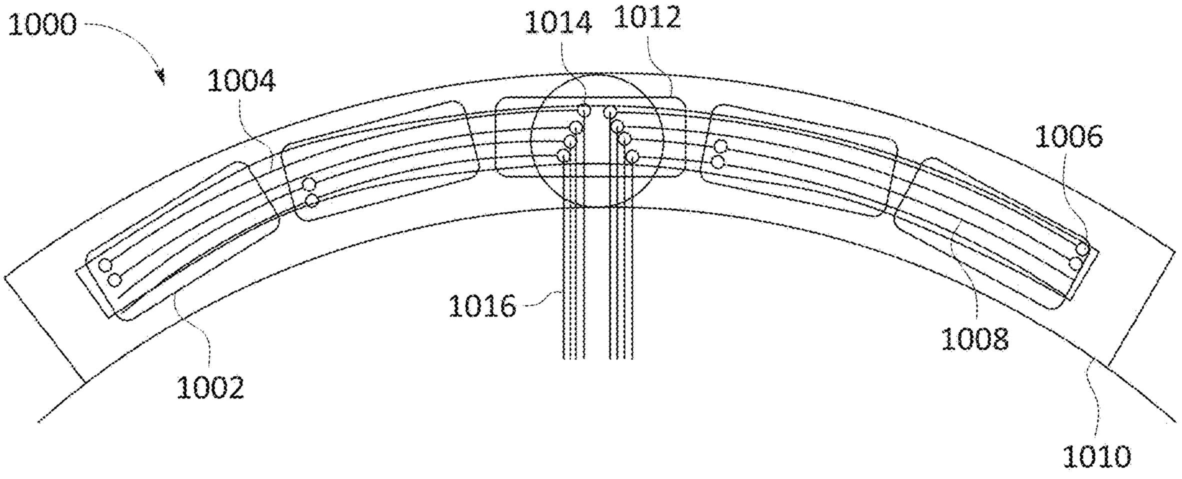
FIG. 10 illustrates another example of the ring topology, in accordance with various embodiments.

FIG. 10 illustrates an example of a ring topology connection diagram 1000, in accordance with various embodiments. The ring topology connection diagram 1000 may comprise one or more modules 1002 interconnected by a plurality of flex PCBs 1004. Although 5 modules 1002 are shown in FIG. 10, the ring topology connection diagram 1000 can comprise any number of modules and can span any number of angular degrees of the circumference of the wheel, up to 360 degrees. Examples of the one or more modules 1002 may include active EH module, dummy module, dummy cavity module, and/or any other types of modules. The one or more modules 1002 may be placed on or along a circumferential surface of a wheel rim 1010, and each of the one or more modules 1002 may comprise one or more interconnect vias 1006, and one or more conductors 1008.

In one example, the one or more modules 1002 comprise a dummy cavity module 1012 used for interconnects and electronic integration in the smart wheel sensor system 100. The dummy cavity module 1012 may comprise one or more termination vias 1014 used for connection with electronic modules, and one or more flex PCBs 1016 used for connecting the dummy cavity module 1012 to one or more power management electronic modules in the smart wheel sensor system 100.

Figure 11A:
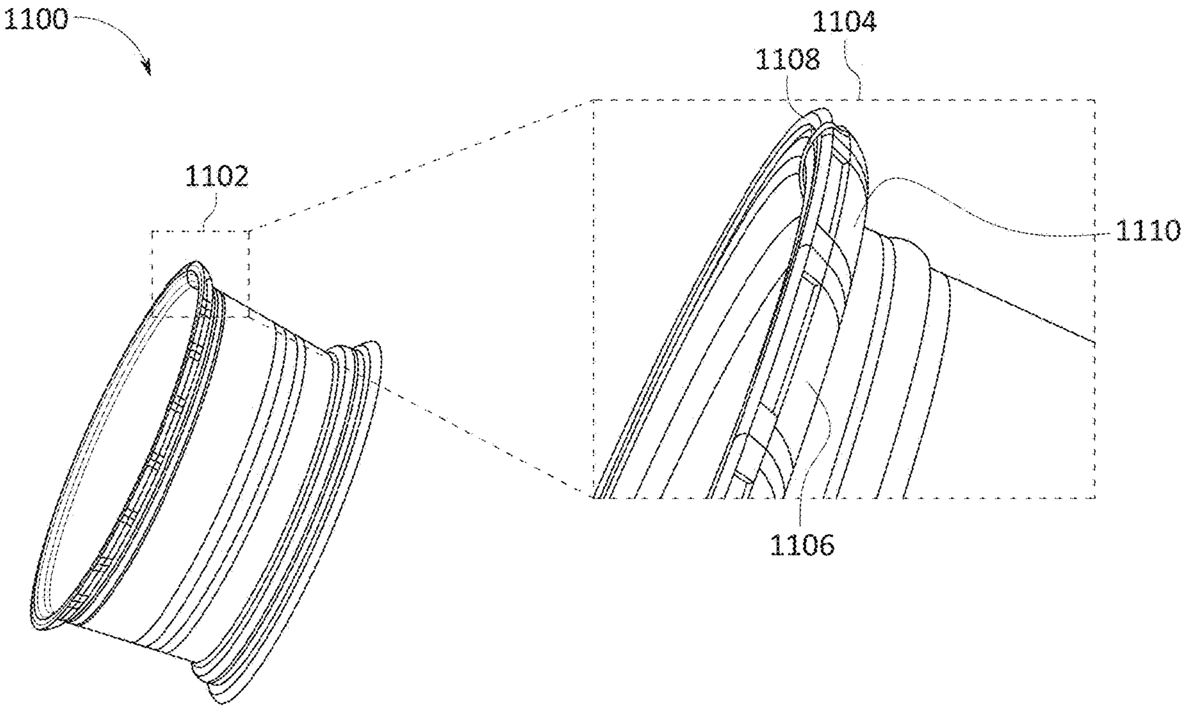
FIG. 11A illustrates yet another example of the ring topology and interconnect configuration, in accordance with various embodiments.

FIG. 11A illustrates another example of a ring topology and interconnect configuration 1100, in accordance with various embodiments. A zoomed version 1104 of a part 1102 of the ring topology and interconnect configuration 1100 is also shown in FIG. 11A. In some embodiments, the ring topology and interconnect configuration 1100 comprises one or more module interconnect flexible cables 1106, a flexible cable 1108, one or more addressable signal and power planes 1110, and other components (e.g., EH modules, sensor modules, etc.) connected in the ring topology configuration. In some embodiments, the one or more module interconnect flexible cables 1106 are configured to connect a plurality of modules in the ring topology and interconnect configuration 1100, including active EH modules, dummy modules, dummy cavity modules, as well as other types of modules depending on particular applications. Each of the one or more addressable signal and power planes 1110 may be used to support a corresponding one or more of the plurality of modules. In some examples, the flexible cable 1108 is configured to connect the one or more module interconnect flexible cables 1106 and a valve-stem feed-through connector. In some embodiments, various modules in the ring topology and interconnect configuration 1100 carry electrical signals, which may be 1) power signals generated by the modules in the ring topology and interconnect configuration 1100, 2) power signals received by the modules in the ring topology and interconnect configuration 1100, or 3) communication signals. In some embodiments, the one or more addressable signal and power planes 1110 are used to carry power signals, and the one or more module interconnect flexible cables 1106 are used to carry communication signals. In some embodiments, the power signals and the communication signals come out from the ring topology and interconnect configuration 1100 through the flexible cable 1108.

Figure 11B:
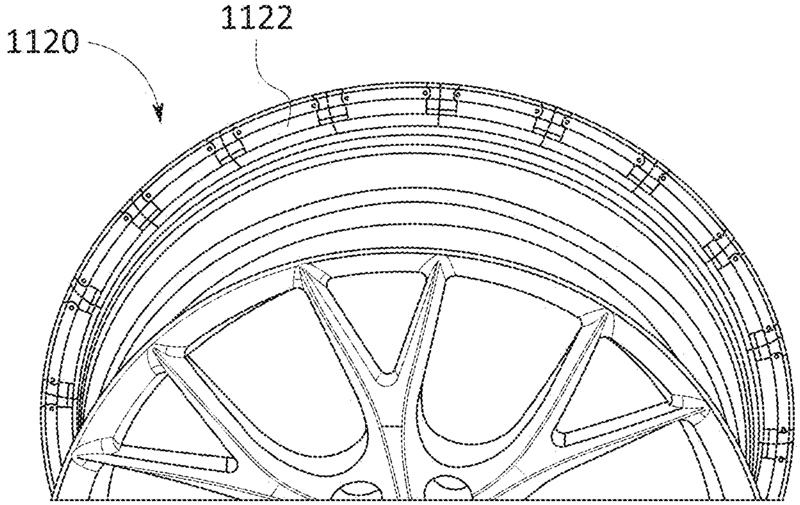
FIG. 11B illustrates a back view of the ring topology and interconnect configuration, in accordance with various embodiments.

FIG. 11B illustrates a back view of a ring topology and interconnect configuration 1120, in accordance with various embodiments. The ring topology and interconnect configuration 1120 may comprise a plurality of modules 1122 interconnected in a ring topology based on various embodiments described in FIG. 11A.

Figure 11C:
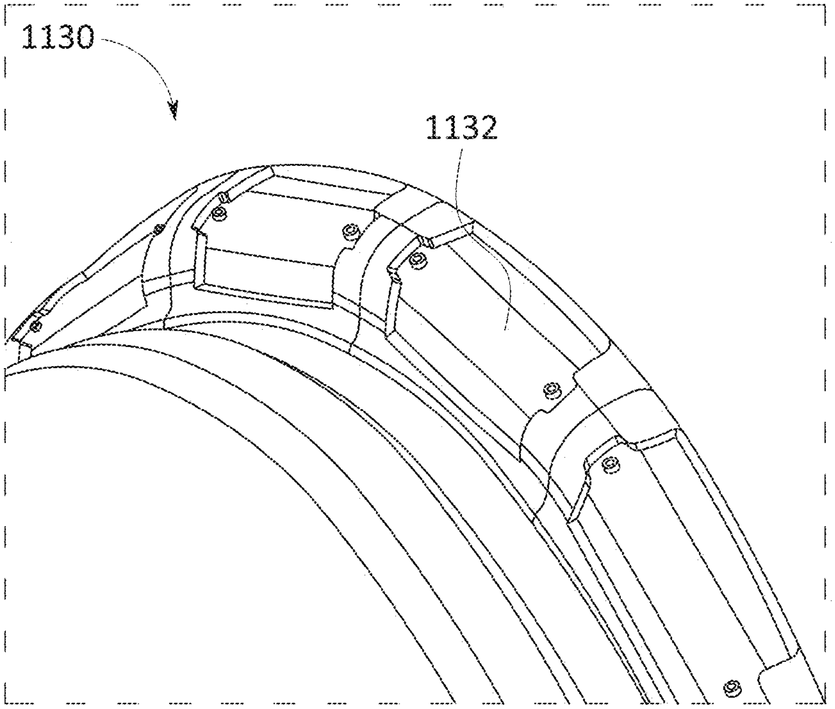
FIG. 11C illustrates a side view of the ring topology and interconnect configuration, in accordance with various embodiments.

FIG. 11C illustrates a perspective side view of a ring topology and interconnect configuration 1130, in accordance with various embodiments. The ring topology and interconnect configuration 1130 may comprise a plurality of modules 1132 interconnected in a ring topology based on various embodiments described in FIG. 11A. As shown in FIGS. 11B and 11C, the plurality of modules 1122 and 1132 provide a continuous or partial ring structure that attaches to an inner circumferential surface of the wheel. The shape of each of the modules 1122, 1132 are curved and configured such that bottom surfaces of the modules 1122, 1132 are flush with the inner circumferential surfaces of the wheel to which they are attached, and the ends of each of the modules 1122, 1132 are configured to precisely interconnect with adjacent modules 1122, 1132 to form the ring topology structure.

Figure 12:
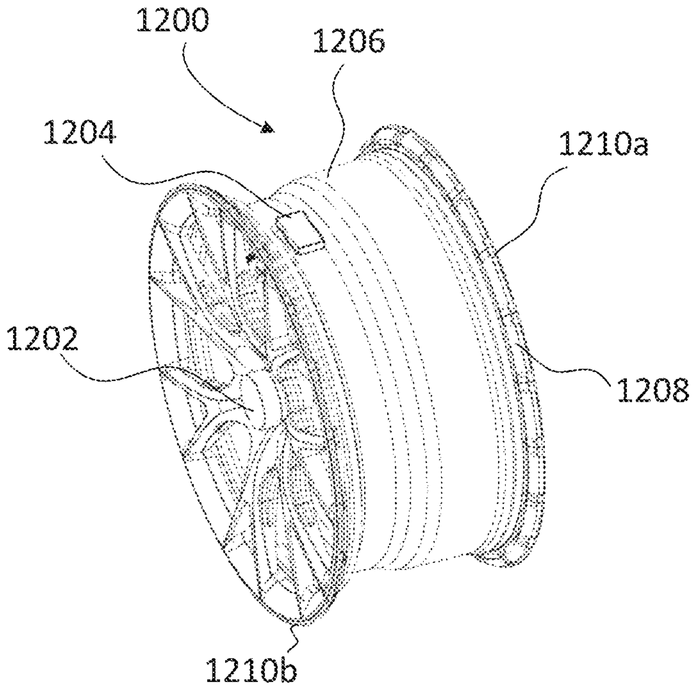
FIG. 12 illustrates an isometric image and a corresponding isometric view of a dual-ring design, in accordance with various embodiments.

FIG. 12 illustrates a perspective view of a dual-ring configuration 1200, in accordance with various embodiments. The dual-ring design 1200 may comprise two ring topologies 1210*a* and 1210*b* as shown, an electronic module 1204, and a plurality of modules 1208 coupled to a circumferential edge surface of the wheel 1206. In accordance with various embodiments, the plurality of modules 1208 can be similar to or the same as the modules described above with reference to FIG. 11A. Examples of the plurality of modules include active EH modules, dummy modules, dummy cavity modules, and/or other types of modules depending the particular application. The functions of the electronic module 1204, the two ring topologies 1210*a* and 1210*b*, and the plurality of modules are described above with reference to FIG. 11A and are, therefore, not repeated here.

In some embodiments, the dual-ring design 1206 comprises a processing and control circuitry 1202 for controlling the functionality of the plurality of modules located in the two ring topologies 1210*a* and 1210*b* and the one or more electronic modules 1204. In some embodiments, there can be multiple ring topologies on the rim of the wheel 410 (e.g., one for outside rim and one for inside rim of the wheel). These ring topologies can be connected to each other using jumper interconnects. In some embodiments, the modules in the first ring topology 1210*a* are electrically coupled to the processing and control circuitry 1202 for providing power and/or data to the circuitry 1202, while the modules in the second ring topology 1210*b* are electrically coupled to a valve stem interconnect structure similar to, or the same as, those described above.

Figure 13:
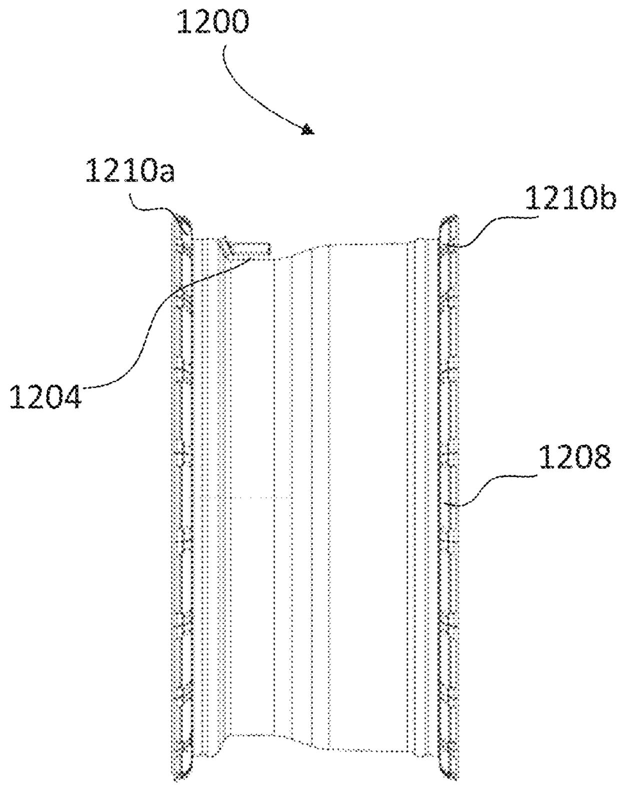
FIG. 13 illustrates an elevation image and a corresponding elevation view of the dual-ring design, in accordance with various embodiments.

FIG. 13 illustrates a side view of the dual-ring design 1200 of FIG. 12, in accordance with various embodiments. As shown in FIG. 13, the dual-ring design 1200 may comprise two interconnect ring topologies 1210*a* and 1210*b* as shown, an electronic module 1204, and a plurality of modules 1208 as described above in connection with FIG. 12.

Figure 14:
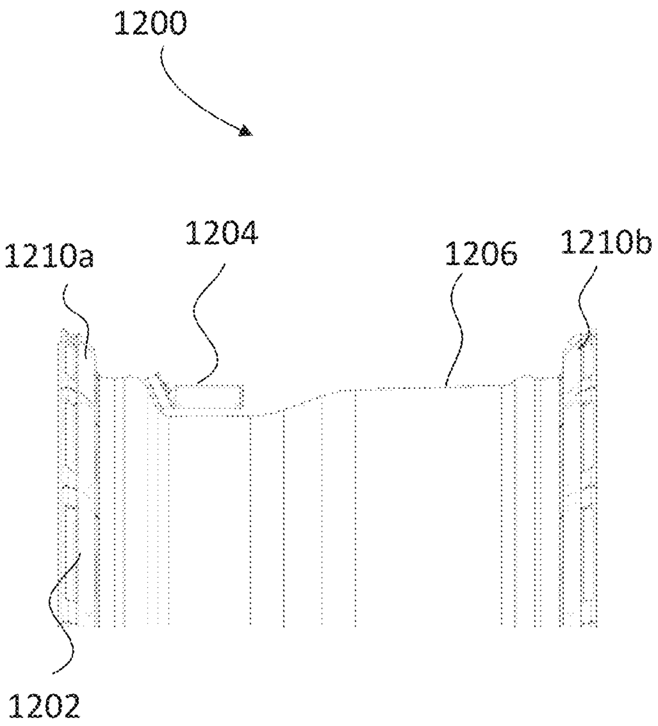
FIG. 14 illustrates a zoomed elevation image and a corresponding zoomed elevation view of the dual-ring design, in accordance with various embodiments.

FIG. 14 illustrates a zoomed side view of the dual-ring interconnect system 1200 of FIG. 12. The functions of the two ring topologies 1210*a* and 1210*b*, the electronic module 1204, and the plurality of modules are described above with reference to FIG. 12 and are, therefore, not repeated here. In some embodiments, a flexible cable 1202 passes through each of the plurality of modules. In other embodiments, the flexible cable 1202 passes through a back side of each of the plurality of modules. In some embodiments, active EH modules in the plurality of modules are placed only in the first ring topology 1210*a*, while other types of modules are placed only in the ring topology 1210*b*. In further embodiments, the active EH modules in the plurality of modules are placed in both ring topologies 1210*a* and 1210*b*.

Figure 15:
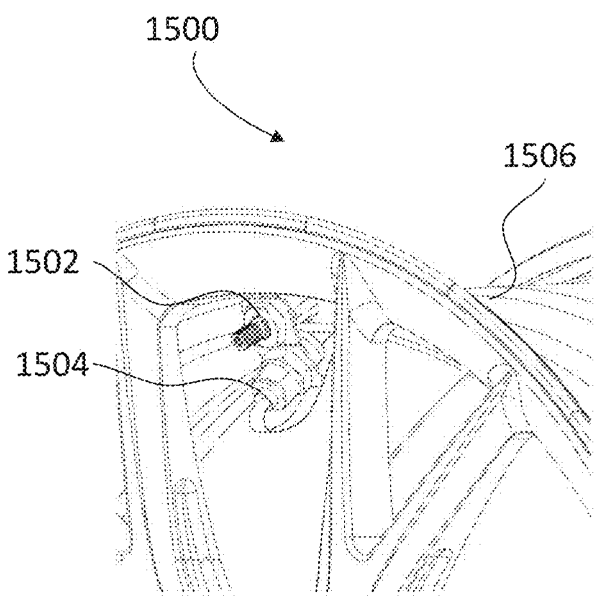
FIG. 15 illustrates an isometric image and a corresponding isometric view of a feedthrough flex Schrader valve installed in a wheel, in accordance with various embodiments.

FIG. 15 illustrates a perspective view 1500 of the feedthrough valve stem interconnect structure 520, described above in connection with FIG. 5C, installed in a wheel 1506, in accordance with various embodiments. In some embodiments, the feedthrough valve stem interconnect structure comprises a valve stem portion 1502 and an electronic connector portion 1504. The valve stem portion 1502 may be used for normal tire inflation, and the electronic connector portion 1504 may be used for connecting with power and communication data lines between electronic components inside the pressurized area of the wheel 1506 to external sensors, energy harvesters and communication modules without having a loss in air pressure inside the wheel 1506. In some embodiments, air inflation through the valve stem portion 1502 and power and data connections through the electronic connector portion 1504 are separate and independent of each other. In some other embodiments, the feedthrough valve stem interconnect structure 520 is electrically coupled to one or more modules in a ring interconnect topology structure, such as those described above with reference to FIGS. 9-14.

Figure 16:
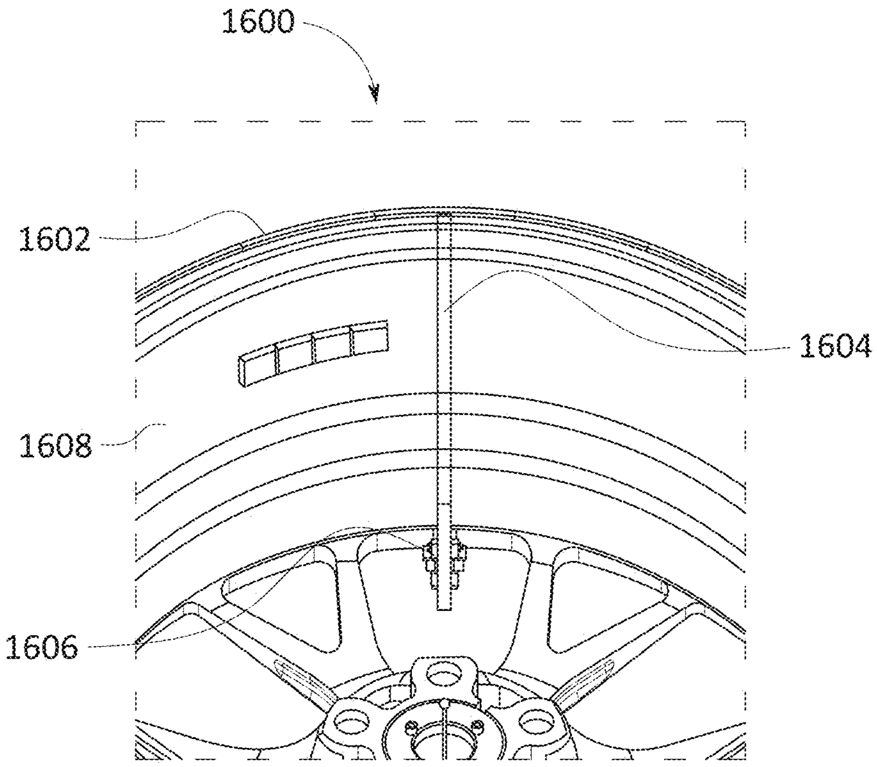
FIG. 16 illustrates an isometric image and a corresponding isometric view of an interconnect configuration in a wheel, in accordance with various embodiments.

FIG. 16 illustrates a perspective view 1600 of an interconnect configuration in a wheel 1608, in accordance with various embodiments. In some embodiments, the wheel 1608 comprises a ring topology interconnect 1602, a flex cable 1604, a valve stem interconnect structure 1606, and may include other components depending on a particular application. The flex cable 1604 traverses an inner top surface of the wheel to electrically connect one or more modules in the ring topology interconnect 1602 to the valve stem interconnect 1606. Thus, the flex cable 1604 allows connections between modules, components, interconnect structures, etc. that may be located on opposite circumferential edges of the wheel. The functions of the ring topology 1602, the flex cable 1604, and the valve stem interconnect structure 1606 are described above with reference to FIG. 12, for example, and are, therefore, not repeated here.

Figure 17:
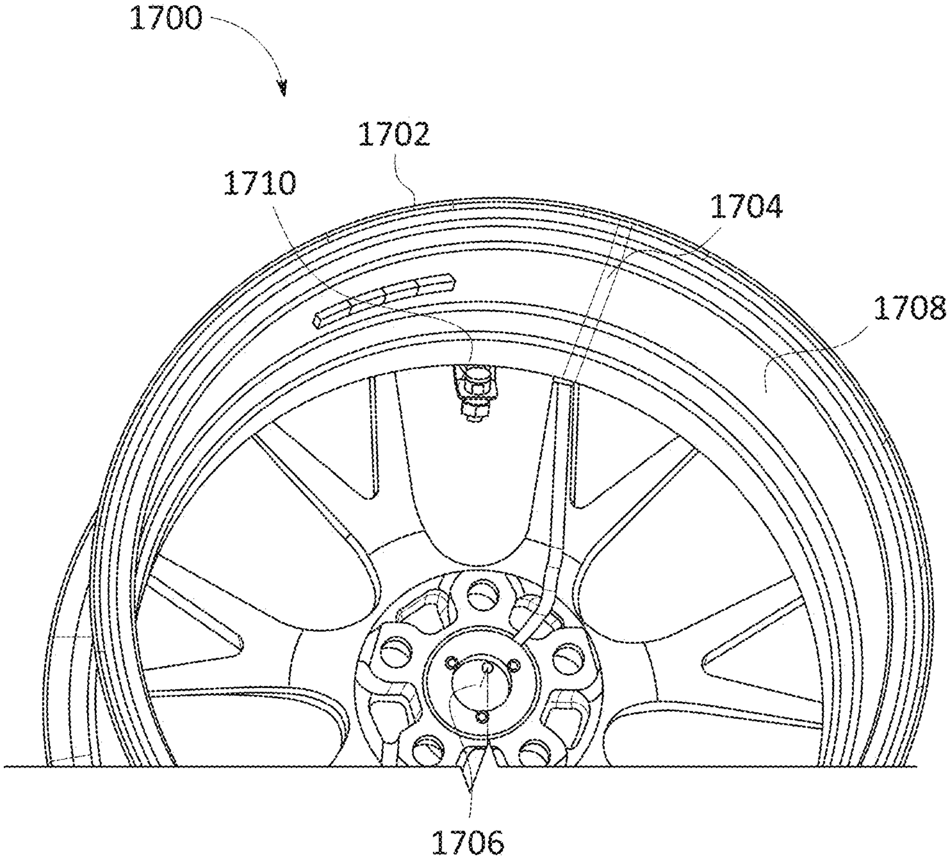
FIG. 17 illustrates another example of an isometric image and a corresponding isometric view of an interconnect configuration in a wheel, in accordance with various embodiments.

FIG. 17 illustrates a perspective view 1700 of an interconnect configuration in a wheel 1708, in accordance with various embodiments. In some embodiments, the wheel 1708 comprises a ring topology interconnect structure 1702 coupled to a circumferential surface of the wheel 1708, a flex cable 1704, a processing and control circuitry 1706, and a valve stem interconnect structure 1710. As shown in FIG. 17, the flex cable 1704 traverses across a lateral/horizontal surface of the wheel 1708 from the ring topology interconnect structure 1702 to electrical connections for power and/or data to the processing and control circuitry 1706. The ring topology interconnect structure 1702 is attached to a proximal circumferential edge surface of the wheel 1708, which is opposite the distal circumferential edge surface of the wheel 1708 where the valve stem interconnect structure 1710 is located, and a distal hub portion of the wheel 1708 where the processing and control circuitry is located. Thus, the flex cable 1704 may be used to connect various modules in the ring topology 1702 to the processing and control circuitry 1706 even when they are located on opposite sides of the wheel from each other, or at relatively far distances from one another. The functions of the ring topology 1702, the flex cable 1704, and the processing and control circuitry 1706 are described above with reference to FIG. 12, for example, and are, therefore, not repeated here.

Figure 18:
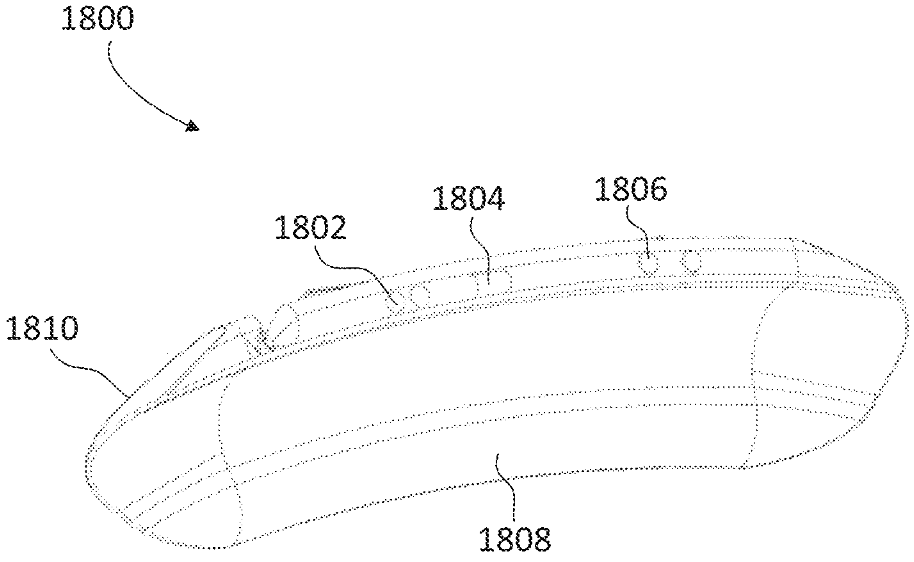
FIG. 18 illustrates an isometric image and a corresponding isometric view of an active EH module, in accordance with various embodiments.

FIG. 18 illustrates a perspective view 1800 of an active EH module 1810, in accordance with various embodiments. In some embodiments, the active EH module 1810 includes one or more optical transceivers 1802, one or more light detection and ranging (LIDAR) sensors 1804, one or more camera and illumination devices 1806 for sensing, navigation, and analytics and a housing 1808. In some embodiments, the one or more optical transceivers 1802 can include lasers, lenses and fiber optics for converting electrical signals to optical signals and vice versa. In one example, the one or more LIDAR sensors 1804 are configured to perform range detection and navigation using vertical cavity surface emitting laser (VCSEL) and single photon avalanche diode (SPAD). In another example, the one or more camera and illumination devices 1806 are configured to capture visible or infrared (IR) light for imaging and feature recognition. In yet another example, the housing 1808 contains an electronic module for controlling the one or more optical transceivers 1802, the one or more LIDAR sensors 1804, and the one or more camera and illumination devices 1806.

Figure 19:
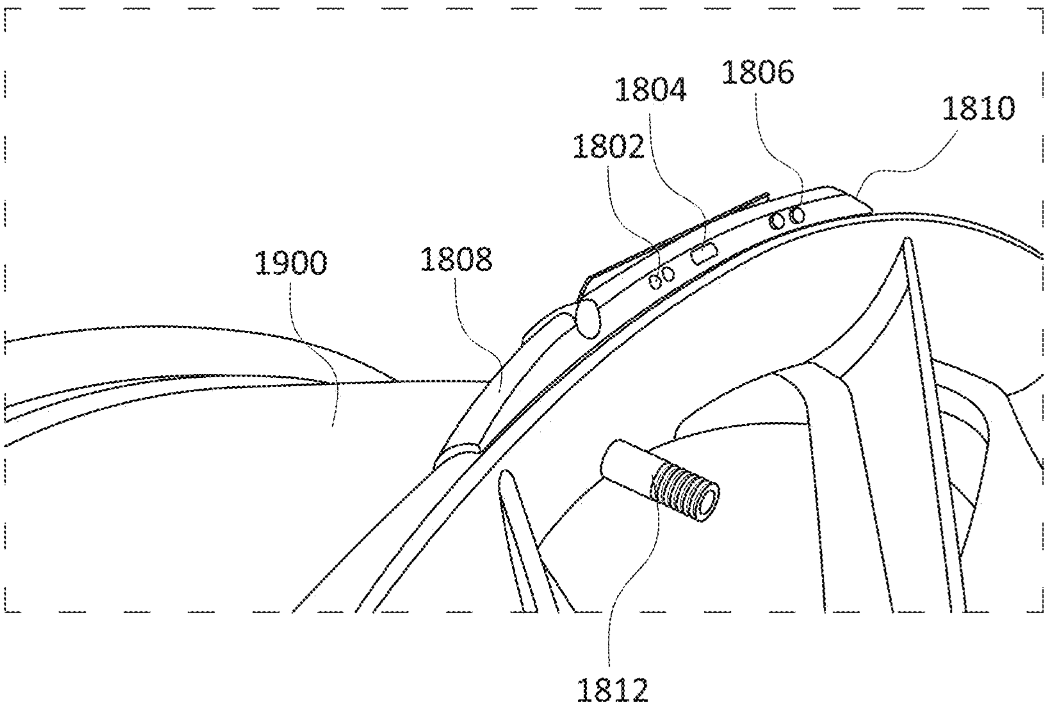
FIG. 19 illustrates another example of an active EH module placed on a wheel rim, in accordance with various embodiments.

FIG. 19 illustrates another example of an active EH module 1810 placed on a wheel rim 1900, in accordance with various embodiments. The EH module 1810 can include a valve stem portion 1812 that is connected to the housing 1808 of the EH module 1810 and provide convention valve stem functions. In some embodiments, the valve stem portion 1812 can be a valve stem interconnect structure similar to, or the same as, one of the valve stem interconnect structures described above with reference to FIGS. 4A-8C, and provide the corresponding functions.

Figure 20:
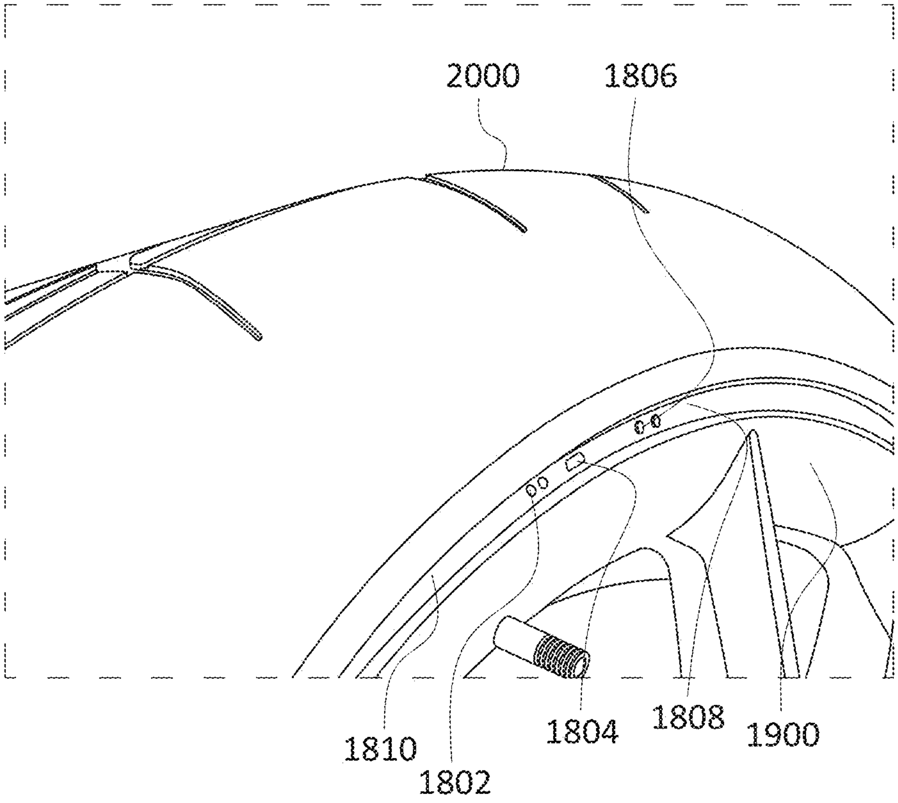
FIG. 20 illustrates yet another example of an active EH module placed between a wheel rim and a tire, in accordance with various embodiments.

Referring again to FIG. 19, the housing 1808 of the EH module 1810 is curved and contoured so that a bottom surface of the housing 1808 will mate or interface with curved and contoured circumferential surfaces of the wheel 1900. Furthermore, the housing 1808 has a low profile such that it can be sandwiched between a bead portion of a tire 2000 and the peripheral rim of the wheel 1900 without allowing air to escape from inside the tire 2000, as shown in FIG. 20. The functions and features of the active EH module 1810, and its respective components, are described above with reference to FIG. 18 and are, therefore, not repeated here.

Figure 21A:
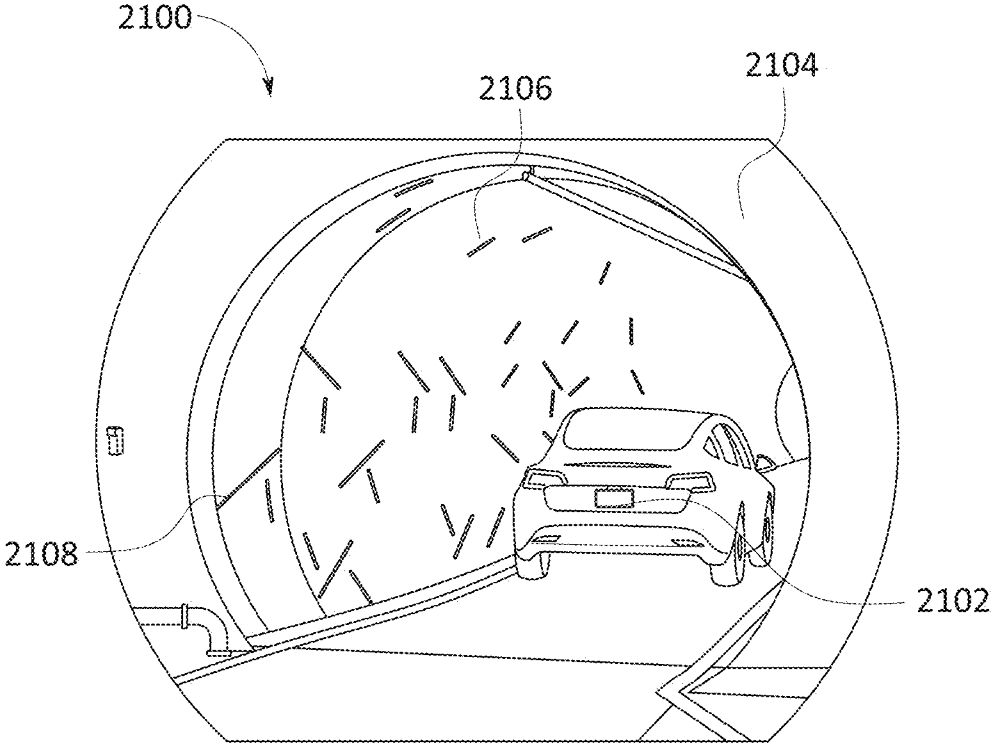
FIG. 21A illustrates an application example of the present disclosure, in accordance with various embodiments.

FIG. 21A illustrates an application example 2100 of the present disclosure, in accordance with various embodiments. In some embodiments, the application example 2100 comprises a vehicle 2102 equipped with the smart wheel sensor system 100 entering a tunnel 2104 comprising an internal wall 2106. In some embodiments, the smart wheel sensor system 100 incorporates one or more EH modules 1810, as described above in connection with FIGS. 18-20. As described above, the one or more active EH modules 1810 includes one or more optical transceivers 1802, one or more light detection and ranging (LIDAR) sensors 1804, one or more camera and illumination devices 1806 for sensing, navigation, and analytics and a housing 1808. In some embodiments, the vehicle 2102 can be driven in the tunnel 2104 while the smart wheel sensor system 100 performs real time, high speed optical sensing. In one example, the smart wheel sensor system 100 performs precise alignment of the vehicle 2102 inside the tunnel 2104 during high-speed autonomous driving using sensors, optical transceivers and optical targets 2108 between the wheel of the vehicle 2102 and the internal wall 2106. In some embodiments, the optical targets 2108 can be provided on surfaces of the internal wall 2106 at periodic intervals to facilitate safe and reliable autonomous driving algorithms while driving through the tunnel.

Figure 21B:
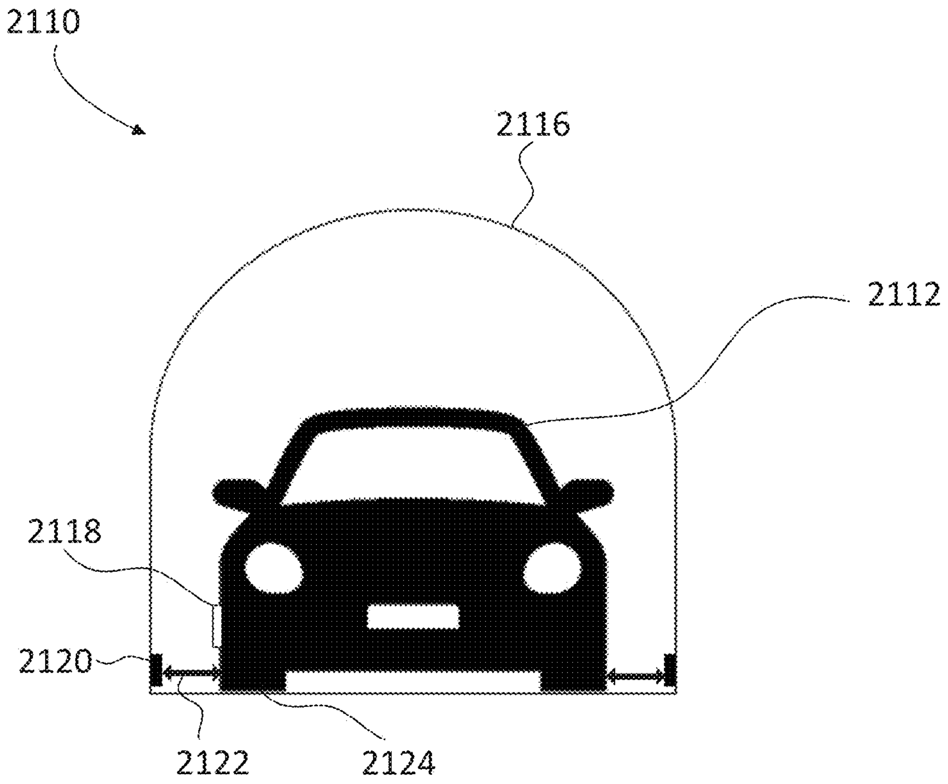
FIG. 21B illustrates another application example for determining a distance between a wheel of a vehicle and an internal wall of a tunnel, in accordance with various embodiments.

FIG. 21B illustrates another application example 2110 of determining a distance between a wheel 2124 of a vehicle 2112 and an internal wall 2116 of a tunnel while the vehicle 2112 is driven inside the tunnel. In some embodiments, the vehicle 2112 comprises one or more optical transceivers 2118 coupled to one or more wheels of the vehicle 2112. In one example, the one or more optical transceivers 2118 are configured to transmit optical light 2122 to a target 2120 installed on the internal wall 2116. The optical light 2122 will be reflected back to the one or more optical transceivers 2118 once it hits the target 2120. Based on a calculated time for the optical light 2122 to be transmitted to the target 2120 and reflected back to the one or more optical transceivers 2118, a distance between the wheel 2124 and the internal wall 2116 can be accurately estimated. In some embodiments, the one or more optical transceivers 2118 comprise a plurality of optical fiber cables that can carry signals to and from various modules inside the wheel 2124 to processing circuitry located on the wheel and/or within the body of the vehicle 2112. The purpose is to provide autonomous driving data in real time that can be processed in real-time to maintain a predetermined gap between the vehicle 2112 and the internal wall 2116 so that the vehicle 2112 is centered inside the tunnel. In some other embodiments, the one or more optical transceivers 2118 are implemented in the vehicle 2112 in addition to proximity ultrasonic sensors already present in the vehicle 2112.

Figure 22:
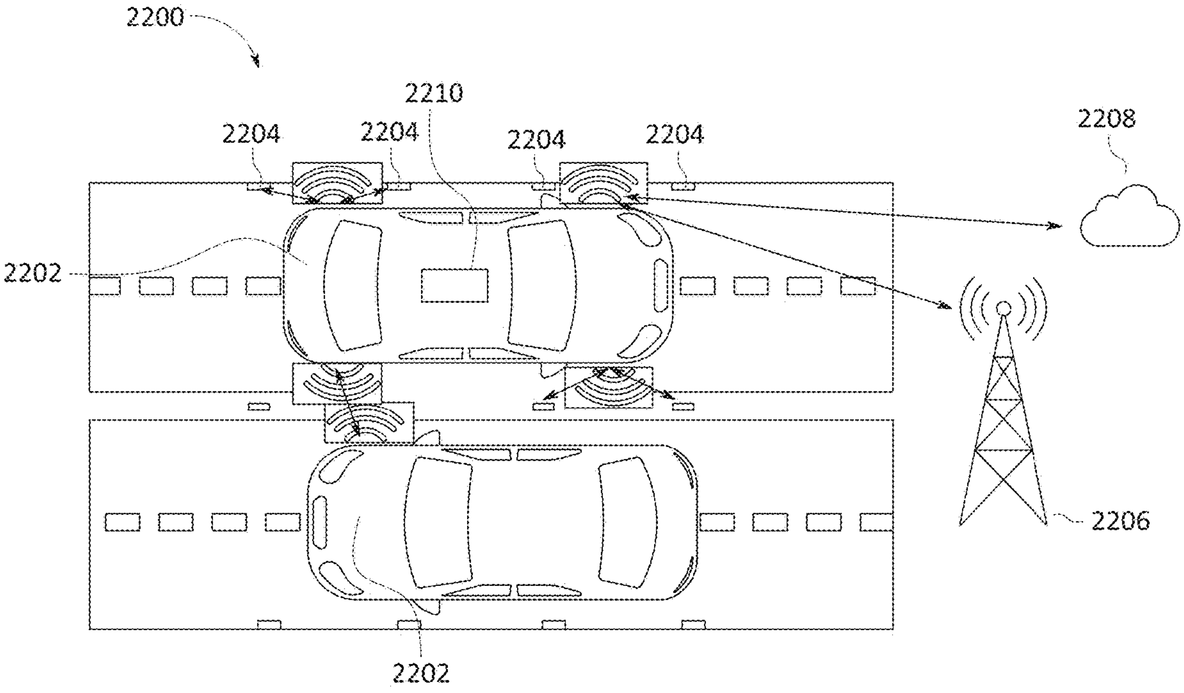
FIG. 22 illustrates yet another application example of the present disclosure, in accordance with various embodiments.

FIG. 22 illustrates another application example 2200 of the present disclosure, in accordance with various embodiments. In some embodiments, the application example 2200 comprises one or more vehicles 2202 equipped with the smart wheel sensor system 100, one or more wireless ground beacons 2204, one or more infrastructure towers 2206, one or more cloud storages 2208, and/or any other components. Examples of the one or more infrastructure towers 2206 include 5G station, long range (LoRa) station, BLE station, and Wi-Fi station.

In one example, sensors implemented in the smart wheel sensor system 100 of the one or more vehicles 2202 are configured to detect real time vehicle dynamics such as acceleration, torque, forces, and vehicle slips. In another example, sensors implemented in the smart wheel sensor system 100 of the one or more vehicles 2202 are configured to monitor wheel and tire safety conditions as well as to detect road conditions and quality such as potholes and other road hazards. The detected road conditions and quality information may be wirelessly transmitted from the smart wheel sensor system 100 to a vehicle central processing system 2210 using deterministic, low latency and low power real time communication by using one or more of interconnect structures and techniques described herein. In some embodiments, this may be achieved by having high gain, directional wireless antennas mounted on the flex interconnect circuits in the smart wheel sensor system 100. The high gain, directional wireless antennas may also provide efficient communications among the smart wheel sensor system 100, the vehicle central processing system 2210, the one or more wireless ground beacons 2204, the one or more infrastructure towers 2206, and the one or more cloud storages 2208. The wheels of the one or more vehicles 2202 may also independently collect and wirelessly store traffic data on the cloud for deep learning and analytics. Navigation maps may also be used to augment the traffic data by sensing adjacent vehicles, obstacles, road conditions, etc.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two, which can be designed using source coding or some other technique), various forms of program or design code incorporating instructions (which can be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware, firmware or software, or a combination of these technique, depends upon the particular application and design constraints imposed on the overall system. Skilled artisans can implement the described functionality in various ways for each particular application, but such implementation decisions should not be interpreted as causing a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A smart wheel system, comprising:

a first plurality of modules attached to a circumferential surface of a wheel, wherein the first plurality of modules are interconnected with one another in a ring configuration that spans along the circumferential surface of the wheel, wherein the first plurality of modules comprises:

at least one energy harvesting (EH) module comprising at least one EH component configured to convert a force acting on the at least one EH component into at least one first electrical signal; and at least one dummy cavity module comprising at least one electronic module;

wherein the at least one EH module and the at least one dummy cavity module are each electrically coupled to an electrical interface coupled to the wheel.

2. The smart wheel system of claim 1, wherein the at least one first electrical signal provides energy to at least one sensor disposed within a tire coupled to the wheel or indicates a parameter value associated with the tire mounted to the wheel.

3. The smart wheel system of claim 1, wherein the first plurality of modules is located between a rim portion of the wheel and a bead area of a tire mounted on the wheel, and wherein the first plurality of modules further comprises at least one dummy module.

4. The smart wheel system of claim 1, wherein the at least one EH component comprises at least one piezoelectric component, wherein the at least one piezoelectric component is configured to produce energy in response to mechanical strain imparted on the at least one piezoelectric component, wherein the at least one piezoelectric component is configured to deform while experiencing the mechanical strain.

5. The smart wheel system of claim 1, wherein the electrical interface comprises a plurality of conductors, wherein the plurality of conductors comprises at least two of the following:

a first conductor for power signal transmission;

a second conductor for data signal transmission;

one or more radio frequency (RF) antenna traces; and one or more optical fibers for transmitting optical signals collected from an optical transceiver.

6. The smart wheel system of claim 1, wherein the electrical interface comprises a valve stem interconnect structure, wherein the valve stem interconnect structure comprises a flexible printed circuit board (PCB) cable that electrically couples a first sensor disposed inside a pressurized area of a tire mounted on the wheel to a connector disposed outside of the pressurized area.

7. The smart wheel system of claim 1, wherein the at least one electronic module comprises at least one of the following:

an energy storage element for storing electrical energy converted from the at least one EH module;

an electric double layer capacitor (EDLC) energy storage element for memory backup;

a power management control integrated circuit (IC);

one or more high voltage input multilayer ceramic capacitors (MLCCs); and an electrical interconnect module for in-tire power delivery.

8. The smart wheel system of claim 1, wherein the first plurality of modules spans an entirety of the circumferential surface of the wheel.

9. A smart wheel system, comprising:

a first plurality of modules attached to a first side of a first circumferential surface of a wheel, wherein the first plurality of modules are interconnected with one another in a first ring configuration that spans along the first circumferential surface of the wheel, and a second plurality of modules attached to a second side of the first circumferential surface of the wheel, wherein the second plurality of modules are interconnected with one another in a second ring configuration that spans along the first circumferential surface of the wheel, wherein:

the first plurality of modules comprises:

at least one first energy harvesting (EH) module comprising at least one first EH component configured to convert a first force acting on the at least one first EH component into at least one first electrical signal; and;

at least one first dummy cavity module comprising at least one first electronic module, wherein the at least one first EH module and the at least one first dummy cavity module are each electrically coupled to a first electrical interface coupled to the wheel, the second plurality of modules comprises:

at least one second EH module comprising:

at least one second EH component configured to convert a second force acting on the at least one second EH component into at least one second electrical signal; and;

at least one second dummy cavity module comprising at least one second electronic module, wherein the at least one second EH module and the at least one second dummy cavity module are each electrically coupled to a second electrical interface coupled to the wheel.

10. The smart wheel system of claim 9, wherein the first electrical interface comprises a first plurality of conductors, and the second electrical interface comprises a second plurality of conductors, wherein the first plurality of conductors comprises at least two of the following:

a first conductor for power signal transmission;

a second conductor for data signal transmission;

a first set of one or more radio frequency (RF) antenna traces; and a first set of one or more optical fibers for transmitting optical signals collected from an optical transceiver, and the second plurality of conductors comprises at least two of the following:

a third conductor for power signal transmission;

a fourth conductor for data signal transmission;

a second set of one or more radio frequency (RF) antenna traces; and a second set of one or more optical fibers for transmitting the optical signals collected from the optical transceiver.

11. The smart wheel system of claim 9, wherein:

the first electrical interface comprises a first valve stem interconnect structure, wherein the first valve stem interconnect structure comprises a first flexible printed circuit board (PCB) cable that electrically couples a first sensor disposed inside a pressurized area of a tire mounted on the wheel to a first connector disposed outside of the pressurized area, and the second electrical interface comprises a second valve stem interconnect structure, wherein the second valve stem interconnect structure comprises a second flexible printed circuit board (PCB) cable that electrically couples a second sensor disposed inside the pressurized area of the tire to a second connector disposed outside of the pressurized area.

12. The smart wheel system of claim 9, further comprising a processing and control circuitry, wherein the processing and control circuitry is electrically coupled to the at least one first EH module and the at least one first dummy cavity module.

13. The smart wheel system of claim 9, wherein the at least one first electronic module comprises at least one of the following:

an energy storage element for storing electrical energy converted from the at least one first EH module;

an electric double layer capacitor (EDLC) energy storage element for memory backup;

a power management control integrated circuit (IC);

one or more high voltage input multilayer ceramic capacitors (MLCCs); and an electrical interconnect module for in-tire power delivery.

14. The smart wheel system of claim 9, wherein the first plurality of modules spans an entirety of the first circumferential surface of the wheel.

15. The smart wheel system of claim 9, wherein:

the first plurality of modules further comprises at least one first sensor module comprising at least one third sensor for measuring at least one physical parameter, wherein the at least one first sensor module is electrically coupled to the at least one first EH module and the at least one first dummy cavity module, and the second plurality of modules further comprises at least one second sensor module comprising at least one fourth sensor for measuring the at least one physical parameter, wherein the at least one second sensor module is electrically coupled to the at least one second EH module and the at least one second dummy cavity module.

16. A vehicle, comprising:

a plurality of wheels, wherein each of the plurality of wheels comprises:

a first plurality of modules attached to a circumferential surface of a respective one of each of the plurality of wheels, wherein the first plurality of modules are interconnected with one another in a ring configuration that spans along the circumferential surface of the respective one of each of the plurality of wheels, wherein the first plurality of modules comprises:

at least one energy harvesting (EH) module comprising at least one EH component configured to convert a force acting on the at least one EH component into at least one first electrical signal; and at least one dummy cavity module comprising at least one electronic module, wherein the at least one EH module and the at least one dummy cavity module are each electrically coupled to an electrical interface coupled to the respective one of each of the plurality of wheels.

17. The vehicle of claim 16, wherein the electrical interface comprises a plurality of conductors, wherein the plurality of conductors comprises at least two of the following:

a first conductor for power signal transmission;

a second conductor for data signal transmission;

one or more radio frequency (RF) antenna traces; and one or more optical fibers for transmitting optical signals collected from a first optical transceiver.

18. The vehicle of claim 16, wherein the electrical interface comprises a valve stem interconnect structure, wherein the valve stem interconnect structure comprises a flexible printed circuit board (PCB) cable that electrically couples a first sensor disposed inside a pressurized area of a tire mounted on the respective one of each of the plurality of wheels to a connector disposed outside of the pressurized area.

19. The vehicle of claim 16, wherein the respective one of each of the plurality of wheels further comprises a processing and control circuitry, wherein the processing and control circuitry is electrically coupled to the at least one EH module and the at least one dummy cavity module.

20. The vehicle of claim 16, wherein the at least one EH module further comprises one or more optical transceivers, one or more light detection and ranging (LIDAR) sensors, and one or more camera and illumination devices.

* * * * *